United States Patent
Yamaguchi et al.

(10) Patent No.: US 6,538,968 B1
(45) Date of Patent: Mar. 25, 2003

(54) INFORMATION RECORDING/REPRODUCING APPARATUS

(75) Inventors: Atsushi Yamaguchi, Ogaki (JP); Kenji Torazawa, Ogaki (JP); Satoshi Sumi, Gifu (JP); Kenji Tanase, Motosu-gun (JP); Yoshihisa Suzuki, Bisai (JP)

(73) Assignee: Sanyo Electric Co, Ltd., Moriguchi (JP)

(*) Notice: Subject to any disclaimer, the term of this patent is extended or adjusted under 35 U.S.C. 154(b) by 0 days.

(21) Appl. No.: 09/284,080

(22) PCT Filed: Sep. 29, 1997

(86) PCT No.: PCT/JP97/03491
§ 371 (c)(1),
(2), (4) Date: Apr. 7, 1999

(87) PCT Pub. No.: WO98/15949
PCT Pub. Date: Apr. 16, 1998

(30) Foreign Application Priority Data

| Oct. 8, 1996 | (JP) | 8-267356 |
| Nov. 29, 1996 | (JP) | 8-320374 |
| Feb. 28, 1997 | (JP) | 9-046760 |
| Jun. 3, 1997 | (JP) | 9-145194 |

(51) Int. Cl.$^7$ ................ G11B 7/08
(52) U.S. Cl. ............ 369/47.53; 369/53.26
(58) Field of Search ........... 369/53.26, 275.3, 369/275.4, 47.53

(56) References Cited

U.S. PATENT DOCUMENTS

| 5,050,156 A | * | 9/1991 | Barton ............ 369/53.26 X |
| 5,134,606 A | * | 7/1992 | Sekiguchi et al. ...... 369/116 |
| 5,249,172 A | * | 9/1993 | Hhagihara et al. ...... 369/116 |
| 5,305,296 A | * | 4/1994 | Konu ............ 369/47.53 |
| 5,463,600 A | * | 10/1995 | Kirino et al. ........ 369/116 |
| 5,602,814 A | * | 2/1997 | Jaquette et al. ...... 369/116 |
| 5,870,375 A | * | 2/1999 | Maeda et al. ........ 369/275.3 |
| 6,128,273 A | * | 10/2000 | Horie et al. ........ 369/275.4 |

FOREIGN PATENT DOCUMENTS

| JP | 5-109073 | 4/1993 |
| JP | 5-225570 | 9/1993 |
| JP | 5-314538 | 11/1993 |
| JP | 0 619 577 A1 | 10/1994 |
| JP | 6-295479 | 10/1994 |

OTHER PUBLICATIONS

Machine translation of JP 5–314538.*
Machine translation of JP 05–109073.*

* cited by examiner

*Primary Examiner*—Aristotelis M. Psitos
(74) *Attorney, Agent, or Firm*—Armstrong, Westerman & Hattori, LLP

(57) ABSTRACT

The present invention provides a recording medium and an information recording/reproducing apparatus which permit recording and/or reproducing by a laser beam of optimized power for each recording medium. The recording medium is provided with a calibration region in addition to an information recording region. The calibration region has wobbles formed such that the amplitude of the waveform of a reproduced signal therefrom can change. Prior to recording to the information recording region, a signal is recorded in the calibration region by changing the laser power, and the recorded signal is immediately reproduced. The waveform of the reproduced signal is evaluated to determine optimum laser power for recording. At the time of reproducing, a signal previously recorded in the calibration region is reproduced while changing the laser power, and laser power optimum for reproducing is determined.

4 Claims, 31 Drawing Sheets

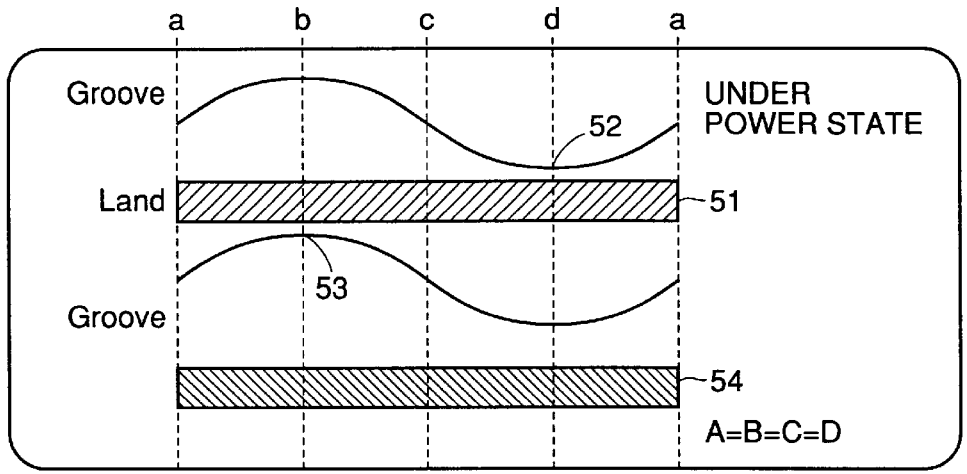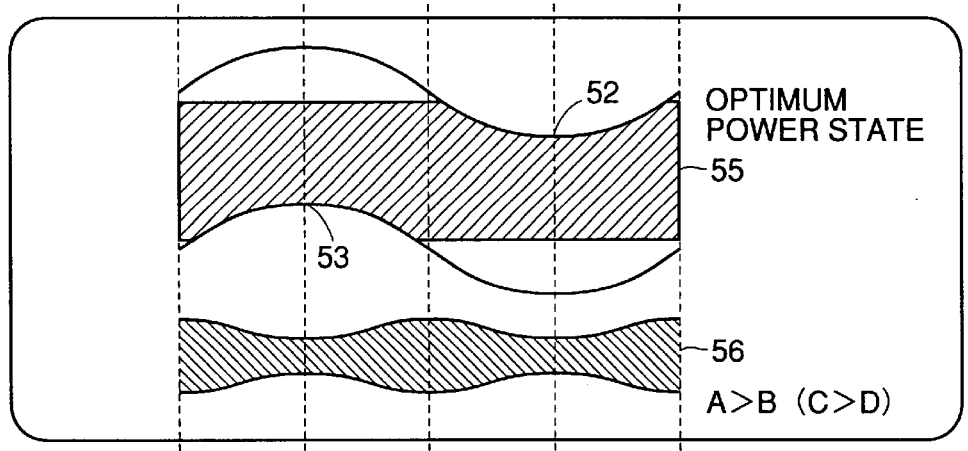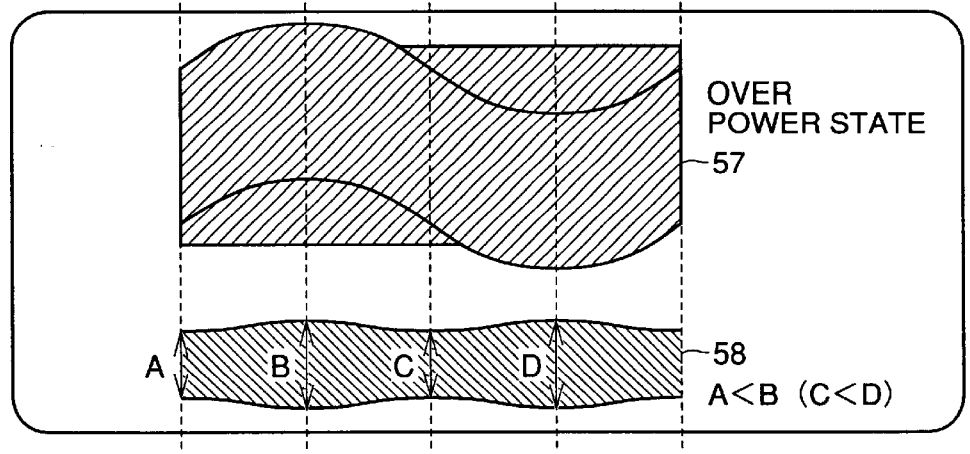

FIG.10
——— SILVER ATOM PRECIPITATED AREA
-------- SILVER COMPOUND ORIENTED AREA
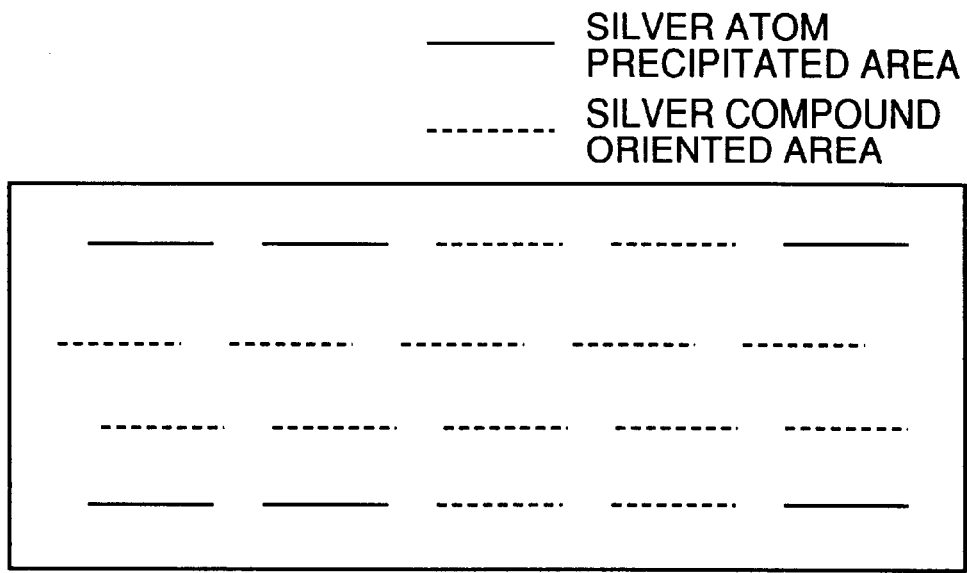
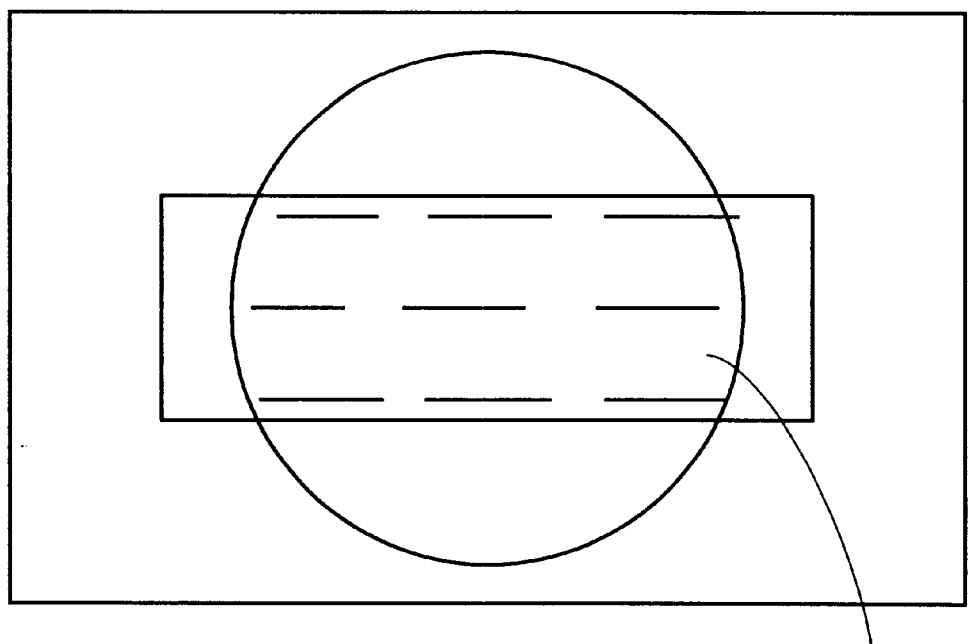
POLARIZING GLASS    EXHIBITING POLARIZATION CHARACTERISTIC

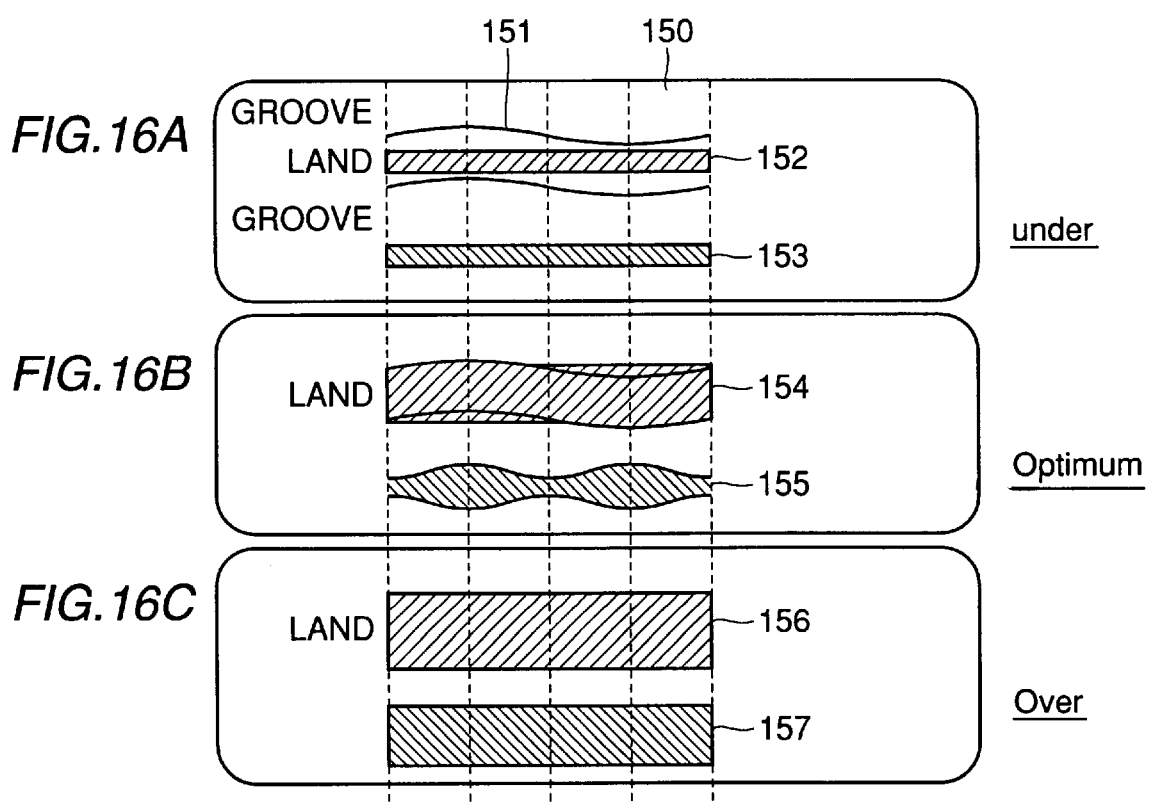
FIG.16A — under
FIG.16B — Optimum
FIG.16C — Over

INITIAL STATE

RECORDING MAGNETIC DOMAIN

TRANSFER

REPRODUCED SIGNAL

MAGNETIC FIELD H

REPRODUCED SIGNAL

MAGNETIC FIELD H

INFORMATION RECORDING/REPRODUCING APPARATUS

TECHNICAL FIELD

The present invention relates to recording media and information recording/reproducing apparatuses, and more particularly, to a recording medium and an information recording/reproducing apparatus permitting optimization of power for recording and/or reproducing information.

BACKGROUND ART

The magneto-optical recording medium has attracted much attention as a highly reliable information recording medium which can be rewritten and has a great storage capacity, and has been used in practice as a memory for a computer. As the amount of information to be recorded increases and more compact recording/reproducing apparatuses have been developed, however, there is a need for techniques for recording/reproducing information at even higher density.

Such techniques of recording/reproducing information with higher density include techniques on the recording medium side and techniques on the recording/reproducing apparatus side.

As one of the former techniques, reproducing resolution is improved using a magnetic multi-layer film, in addition to reducing the pitch of recording tracks on the medium. According to the technique of improving reproducing resolution using a magnetic multi-layer film, the magnetic multi-layer film including a recording layer and a reproducing layer is provided within a magneto-optical recording medium. Then, the magnetized state of the recording layer is selectively transferred to the reproducing layer by exchange interaction at the position irradiated with a laser beam for reproduction, taking advantage that the temperature distribution within the laser spot gives a Gaussian distribution maximized in the vicinity of the center of the laser spot, and the magnetized state of the reproducing layer is read out at high density. Such a magneto-optical recording medium which permits high density recording, including the magnetic multi-layer film, is generally referred to as "a super-resolution magneto-optical recording medium".

Such techniques are mainly grouped into three kinds of techniques at present, that is, FAD (Front Aperture Detection), RAD (Rear Aperture Detection) and CAD (Center Aperture Detection). According to these techniques, a front, rear or central part of a laser spot becomes aperture, so that substantial reproducing region is set smaller than the diameter of the laser spot. As a result, the reproducing density may be increased.

Meanwhile, as one of the latter techniques, a so-called optical super-resolution method is known, according to which a collected light spot exceeding the limit of diffraction of a laser beam is available by inserting a shielding article in the optical path of the laser beam, in addition to reduction of the wavelength of the laser beam. Furthermore, high density recording may be implemented by modulating a magnetic field applied at the time of recording, pulsing a laser beam or the like, and recording at a domain length of 0.15 $\mu$m at its shortest is permitted at present.

In a magneto-optical recording medium, information such as the power of a laser beam suitable for recording or reproducing, the rotating speed of a disk or the like is previously stored at the starting end side of the track, and such information is read out during recording or reproducing for use in various kinds of control.

Such data pre-stored for laser beam power is nothing but simple reference, because the shape of the magnetic film varies among media. Therefore, whether the laser power based on the data is optimum for the medium or not should be determined by actually recording or reproducing information to/from the medium using the laser beam. If the track pitch of a recording medium is narrow, and the laser power based on the data is not suitable for the medium in practice, cross erase or cross talk occurs between tracks. Note that the cross erase refers to erroneously erasing a signal recorded at a land or groove when the next groove or land is recorded with a signal.

Furthermore, if the previously recorded data itself is not correct, appropriate recording or reproducing operation to the recording medium cannot be achieved by a recording/reproducing apparatus controlling the power of the laser beam based only on the data.

It is a main object of the present invention to provide a recording medium and an information recording/reproducing apparatus permitting individually determining optimum laser power in practice for the medium on a recording medium-basis.

DISCLOSURE OF INVENTION

According to one aspect of the present invention, a recording medium has a recording region for recording information, and one or more calibration regions, each of which has a track shape modulated such that the amplitude of the waveform of a signal reproduced therefrom can change.

According to another aspect of the invention, an information recording/reproducing apparatus for the recording medium as described above includes an optical head for reproducing a signal from the calibration region, and a determination circuit for determining the presence/absence of change in the amplitude of the reproduced signal, thereby determining power for recording and/or reproducing information.

According to yet another aspect of the present invention, the track of a magneto-optical recording medium is divided into a plurality of zones, each of which has a recording region for recording information, and a calibration region having wobbles formed such that the amplitude of the waveform of a reproduced signal can change.

According to yet another aspect of the present invention, a magneto-optical recording medium has a TOC region recorded with a TOC at a part of a track on the starting end side, a calibration region having wobbles such that the amplitude of the waveform of a reproduced signal can change, and a recording region for recording information at another part of the track.

According to a still further aspect of the present invention, a magneto-optical recording medium has a TOC region recorded with a TOC at a part of the outermost periphery of a track on the starting end side, a calibration region having wobbles at a part of the innermost periphery of the track such that the amplitude of the waveform of a reproduced signal can change, and a recording region for recording information at another part of the track.

According to a still further aspect of the present invention, a magneto-optical recording medium has a TOC region recorded with a TOC at a part of the outermost periphery of a track on the starting end side, a calibration region having wobbles at prescribed intervals on the track such that the amplitude of the waveform of a reproduced signal can change, and a recording region for recording information at another part of the track.

According to a still further aspect of the present invention, a magneto-optical recording medium has a TOC region recorded with a TOC at a part of the outermost periphery of a track on the starting end side, a calibration region having wobbles at prescribed intervals along the direction of a segment at a prescribed angle with respect to a segment connecting the center of the magneto-optical recording medium and the starting end of the outermost periphery of the track such that the amplitude of the waveform of a reproduced signal can change, and a recording region for recording information at another part of the track.

According to a still further aspect of the present invention, an information recording/reproducing apparatus for recording/reproducing information to/from a magneto-optical recording medium including a recording region for recording information, and a calibration region having wobbles such that the waveform of a reproduced signal can change includes an optical head for radiating a single laser beam to the magneto-optical recording medium, a determination circuit for determining the waveform of a signal reproduced by the optical head, and a control circuit for controlling the optical head based on the result of determination.

According to an additional aspect of the present invention, an information recording/reproducing apparatus for recording/reproducing information to/from a magneto-optical recording medium including a recording region for recording information, and a calibration region having wobbles such that the amplitude of the waveform of a reproduced signal can change includes an optical head for selectively radiating a single laser beam or a beam formed of a main beam and two side beams to the magneto-optical recording medium, a determination circuit for determining the waveform of a signal reproduced by the optical head, and a control circuit for controlling the optical head based on the result of determination.

According to an additional aspect of the present invention, a magneto-optical recording medium includes a magnetic layer which permits a magnetically recorded signal to be transferred and reproduced, and an information recording/reproducing apparatus includes means for expanding the magnetic domain of the reproduced signal.

According to an additional aspect of the present invention, an optical head is controlled at the time of recording such that a signal is recorded by a main beam in a calibration region, and a signal recorded is reproduced by side beams.

According to an additional aspect of the present invention, a control circuit controls the optical head to radiate a single laser beam to a calibration region at the time of reproducing.

According to an additional aspect of the present invention, an information recording/reproducing apparatus for recording/reproducing information to/from a magneto-optical recording medium including a recording region for recording information, and a calibration region having wobbles such that the amplitude of the waveform of a reproduced signal can change includes an optical head for selectively radiating a single laser beam or a beam formed of a main beam and first to eighth side beams to the magneto-optical recording medium, a determination circuit for determining the waveform of a signal reproduced by the optical head, and a control circuit for controlling the optical head based on the result of determination.

In the recording medium and information recording/reproducing apparatus according to the present invention, change in the amplitude of the waveform of a signal reproduced from the calibration region is evaluated to determine optimum power for recording and/or reproducing.

BRIEF DESCRIPTION OF DRAWINGS

FIGS. 5A to 5C illustrate the process of determining appropriate recording power according to the first embodiment of the invention;

FIG. 10 illustrates a polarization glass used according to the first embodiment of the invention;

FIGS. 16A to 16C illustrate the process of determining optimum laser power at the time of recording and reproducing according to the second embodiment of the invention;

BEST MODE FOR CARRYING OUT THE INVENTION

Embodiments of the invention will be now described in conjunction with the accompanying drawings.

First Embodiment

Figure 1:
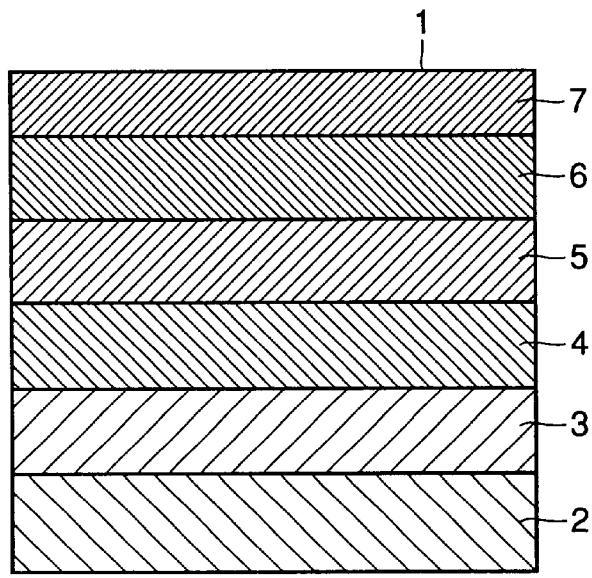
FIG. 1 is a cross sectional view of a magneto-optical recording medium according to the present invention.

Referring to FIG. 1, an example of the layered structure of a magneto-optical recording medium used according to the present invention will be described. In FIG. 1, a magneto-optical recording medium 1 includes a transparent substrate 2 formed of polycarbonate, glass or the like, an underlying layer 3 of SiN formed on substrate 2, a reproduction layer 4 of GdFeCo formed on underlying layer 3, a recording layer 5 of TbFeCo formed on reproduction layer 4, a protection layer 6 of SiN formed on recording layer 5, and an ultraviolet curing resin layer 7 formed on protection layer 6.

In the layered structure shown in FIG. 1, underlying layer 3, reproducing layer 4, recording layer 5, and protection layer 6 are formed by means of magnetron sputtering. The thickness of underlying layer 3 is in the range from 600 to 800 Å, the thickness of reproducing layer 4 is in the range from 50 to 1000 Å, the thickness of recording layer is in the range from 500 to 3000 Å, the thickness of protection layer 6 is in the range from 500 to 1000 Å, and the thickness of ultraviolet curing resin layer 7 is on the order of 10 $\mu$m.

In magneto-optical recording medium 1 shown in FIG. 1, reproduction layer 4 may be of GdFe, GdCo or TbCo other than of GdFeCo, and alternatively, may be a magnetic film formed of one element selected from the group consisting of Ho, Gd, Tb and Dy and one element selected from the group consisting of Fe, Co, and Ni. Recording layer 5 may be a single or multi-layer magnetic film formed of one element selected from the group consisting of Tb, Dy and Nd and one element selected from the group consisting of Fe, Co and Ni other than TbFeCo, and further alternatively, may be a single or multi-layer magnetic film formed of one element selected from the group consisting of Pt and Pd and one element selected from the group consisting of Fe, Co and Ni.

Figure 2:
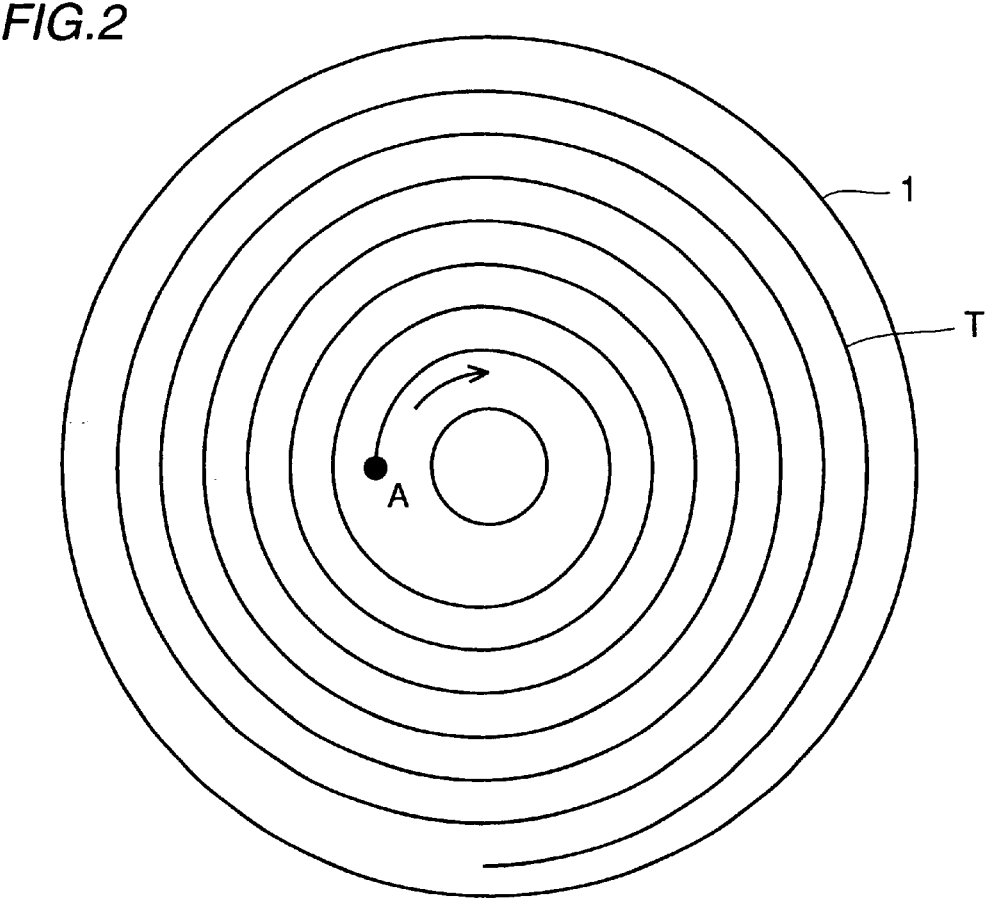
FIG. 2 is a schematic plan view showing the shape of a track on a magneto-optical recording medium according to a first embodiment of the invention.

Referring to FIG. 2, one spiral track T defined by a land/groove is formed on the surface of magneto-optical recording medium 1 having the layered structure as described above. Note that a plurality of concentric tracks may be formed rather than the single spiral track. In FIG. 2, track T is recorded with a "Table of Contents (hereinafter simply as a TOC)" information clockwise from starting point A, followed by a nothing-recorded region of about 150 $\mu$m, and then data is recorded. Recorded as such TOC information are address numbers, the power of a laser beam used for recording or reproducing, and the rotation speed of the disk. The TOC information may be recorded as pits on the track, or as wobbles at both walls of the groove forming the track.

Figure 3:
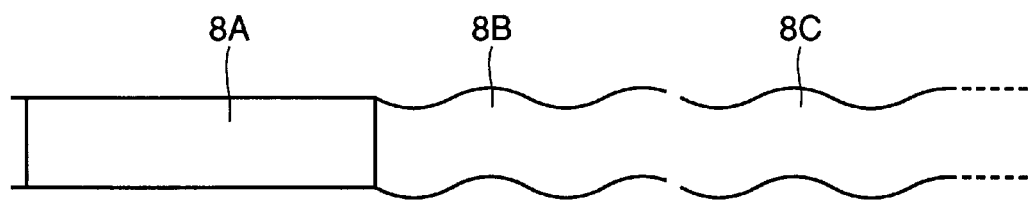
FIG. 3 is a schematic view showing the structure of the track on the starting end side on the magneto-optical recording medium according to the first embodiment of the invention.

Referring to FIG. 3, features of magneto-optical recording medium 1 according to the present invention will be described. In magneto-optical recording medium 1 according to the present invention, regions 8A, 8B and 8C are present in this order from the starting end side of the track. In the first region 8A, the above-described TOC information is recorded as pits or wobbles (hereinafter the region is referred to as "TOC region"). In the next region 8B, wobbles are formed at a frequency in the range from 0.01 to 2 MHz on both sides of the groove forming the track. In region 8B, no signal is recorded if the magneto-optical recording medium is not yet recorded with data, in other words if it is not yet used. Region 8C for recording data (hereinafter "data region") is present next to region 8B.

According to the present invention, using region 8B between TOC region 8A and data region 8C, the power of a laser beam at the time of recording and/or reproducing is optimized. Hereinafter, region 8B is referred to as "calibration region".

The optimization of the laser power at the time of recording data to magneto-optical recording medium 1 will be now described. It is assumed, that in this state, no signal has been recorded in calibration region 8B. During recording, once the optical head which will be described reaches calibration region 8B, the power of a laser beam emitted from a semiconductor laser, a component of the optical head, is sequentially changed, and a signal is recorded by the various kinds of laser power in calibration region 8B. It is then confirmed immediately after recording if recording by each laser power is appropriately performed, and optimum recording power is determined before the optical head reaches data region 8C.

Figure 4:
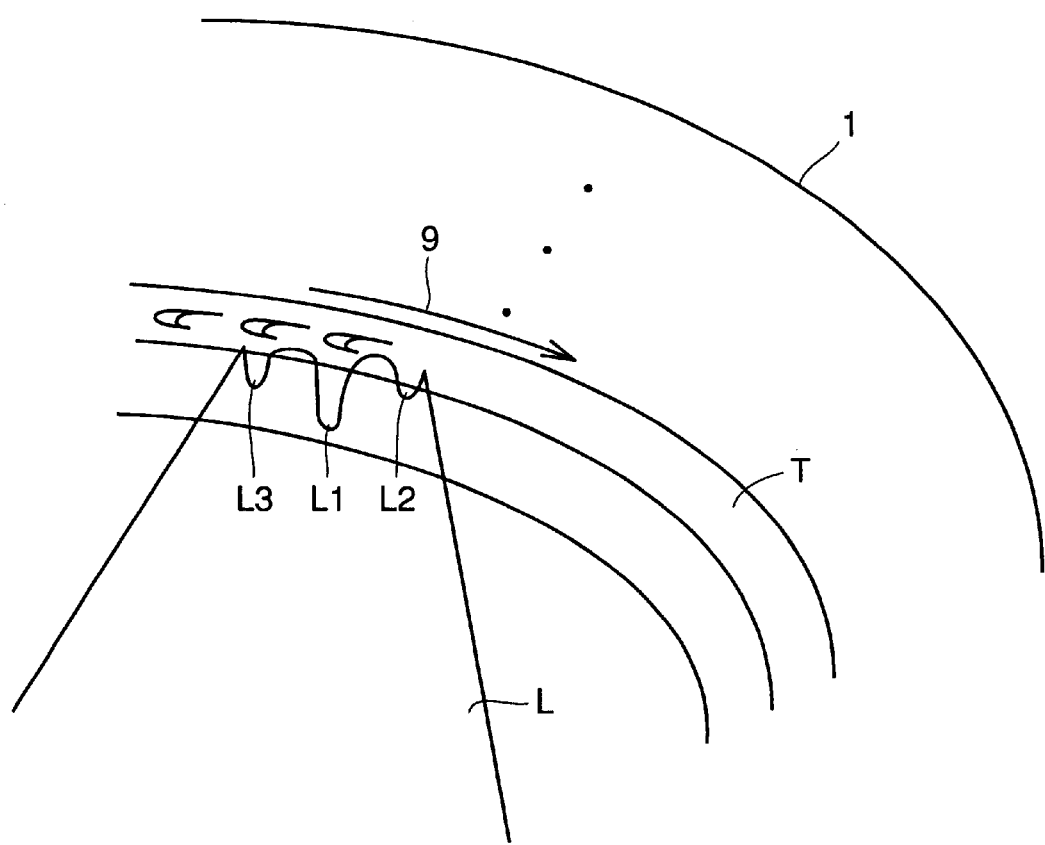
FIG. 4 is a schematic diagram showing how a laser beam is irradiated in a calibration region according to the first embodiment of the invention.

A method of confirming whether recording by each laser power is appropriately performed immediately after the recording will be now described in conjunction with FIG. 4. A laser beam L formed of a main beam L1 and two side beams L2 and L3 is radiated upon track T within the calibration region 8B of magneto-optical recording medium 1. Side beams L2 and L3 are on both sides of main beam L1 along the track direction (direction denoted by arrow 9 in FIG. 4), and side beam L2, main beam L1 and side beam L3 are radiated upon track T in this order. The optical head generating such laser beam L formed of main beam L1 and side beams L2 and L3 will be later described in detail.

According to the present invention, while a signal is recorded to track T using main beam L1, the power of which sequentially changes, then the recorded signal is immediately reproduced using side beam L3 following main beam L1 and the characteristic of the reproduced waveform is evaluated for determining optimum recording power. A method of determining optimum recording laser power will be now described in conjunction with FIGS. 5A to 5C.

As described above, since calibration region 8B has wobbles, the land or groove meanders at a prescribed cycle when viewed from the top. Since the optical head moves straight forward over the meandering land or groove, signals should be recorded in a region within the track inner than the width defined by the raised and recessed portions of wobbles meandering at the prescribed cycle.

FIG. 5A shows a recording region 51 formed by main beam L1 when recording laser power is small, and recording region 51 is formed on the inner side than the region corresponding to the width defined by a recessed portion 52 of one wobble and a raised portion 53 of another wobble within calibration region 8B. In FIG. 5A, the amplitudes A, B, C, and D of a reproduced signal detected at time points a, b, c, and d, respectively at each ¼ the wavelength of the wobble satisfy A=B=C=D, and therefore, the waveform 54 of a signal reproduced by side beam L3 has a constant amplitude. Herein, the width of recording region 51 does not reach both sidewalls of the land or groove, and therefore laser power may be further raised.

FIG. 5B shows a recording region 55 formed by main beam L1 when the recording laser power is raised to an appropriate level. In FIG. 5B, recording region 55 extends further outward from the region formed by the width defined by the recessed portion 52 and raised portion 53 of the wobbles in calibration region 8B, but does not protrude from both sidewalls of the land or groove. The waveform 56 of a signal reproduced by side beam L3 in FIG. 5B satisfies the relation wherein the amplitudes at the above time points a, b, c and d satisfy A>B(C>D).

FIG. 5C shows a recording region 57 formed by main beam L1 when the recording laser power is larger and exceeds an appropriate level. In FIG. 5C, recording region 57 substantially protrudes from both sidewalls of the land or groove due to its excessive laser power, and is formed intruding into the groove or land on both sides. The waveform 58 of a signal reproduced by side beam L3 in FIG. 5C satisfies the relation represented by A<B(C<D), wherein A, B, C and D are the amplitudes of the signal at time points a, b, c, and d, respectively.

As a result, according to the present invention, it is determined that the recording laser power when the reproduced waveform shown in FIG. 5B is obtained is appropriate power. The range of the laser power sequentially changing during determining such appropriate recording power is for example in the range from 2 to 7 mW. The range is however not necessarily fixed, and may be appropriately changed based on data related to laser power reproduced from, for example, TOC region 8A.

After determining the appropriate recording power by the process as described above in calibration region 8B, the optical head records data to data region 8C by a laser beam at the determined power level. In the example shown in FIG. 3, wobbles are formed on both sides of a groove or land in data region 8C. However, such wobbles do not necessarily have to be formed in data region 8C, and the groove or land may have a normal shape.

Optimization of laser power during reproducing data from magneto-optical recording medium 1 will be now described. In this state, in calibration region 8B, a recording domain is formed by laser power changing as shown in FIGS. 5A to 5C during recording, or a domain for use in determining power during reproducing is previously formed.

At the time of reproducing data from magneto-optical recording medium 1, the optical head reaches calibration region 8B, and a domain by the appropriate power shown in FIG. 5B, the position of which is specified by data at the time of recording, among a plurality of domains recorded by various levels of laser power at the time of recording or a domain initially provided for determining reproducing power is reproduced with the reproducing laser power sequentially changing to determine appropriate reproducing power. In this case, the laser beam radiated upon calibration region 8B is a single laser beam rather than the laser beams at the time of recording as shown in FIG. 4.

The appropriate recording laser power is determined to satisfy the relation A>B(C>D), wherein A, B, C and D represent the amplitudes of the reproduced waveform at time points a, b, c, and d, respectively, and therefore appropriate reproduced laser power is also determined such that the amplitudes of reproducing waveform at the time points satisfy the relation A>B(C>D). In this case, at the time of determining the appropriate reproducing laser power, the range of sequentially changing laser power is for example in the range from 0.8 to 2.0 mW.

After the appropriate reproducing laser power is determined according to the process as described above in calibration region 8B, the optical head reaches data region 8C, and reproduces data by a laser beam at the determined power level.

Figure 6:
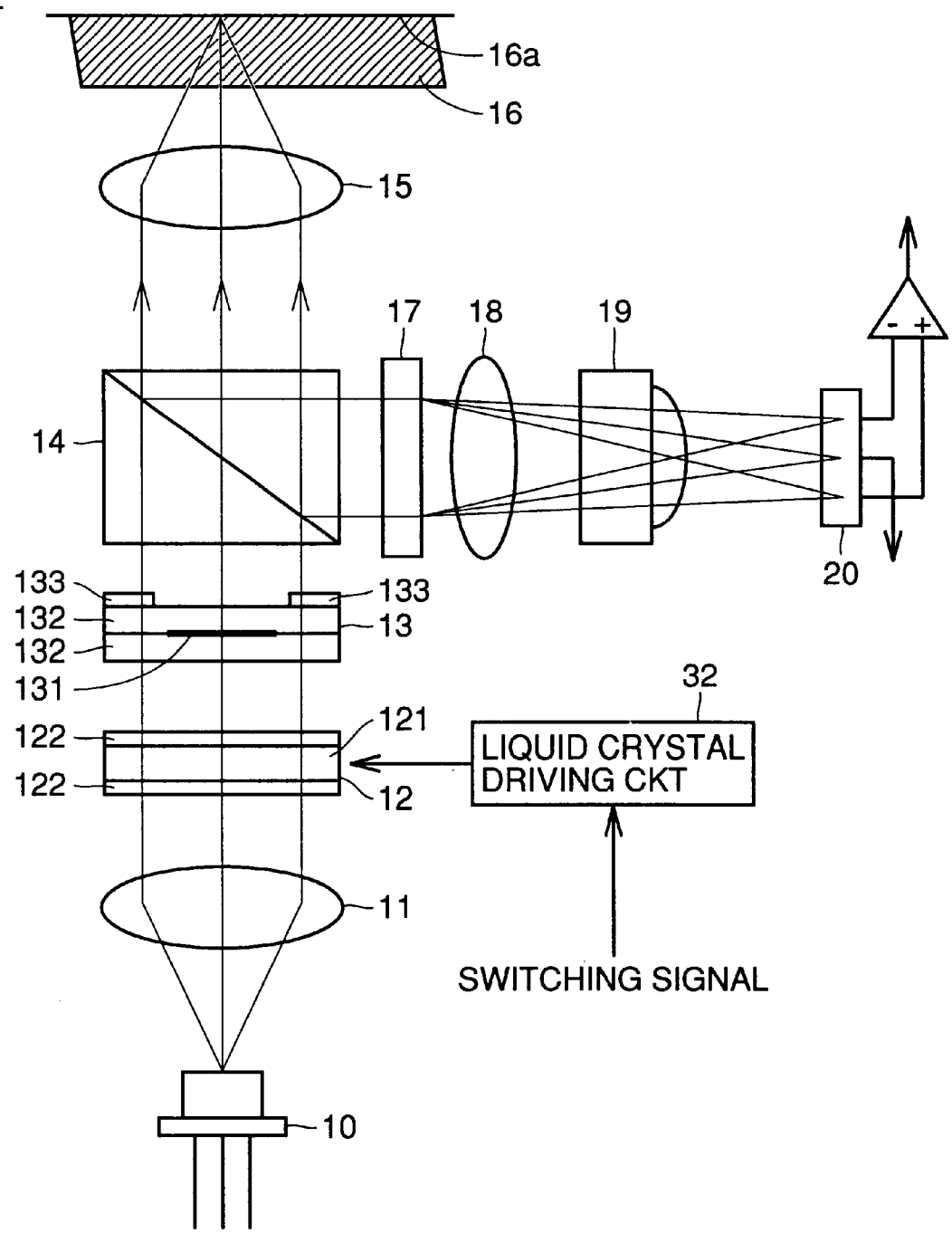
FIG. 6 is a schematic diagram showing the structure of an optical head according to the first embodiment of the invention.

Referring to FIG. 6, optical head 38 for recording or reproducing data to/from magneto-optical recording medium 1 as described above will be now described. Optical head 38 includes a semiconductor laser 10, a collimator lens 11, a plane of polarization rotating unit 12, a polarization selecting unit 13, a half mirror 14, an objective lens 15, a Wollaston prism 17, a collective lens 18, a cylindrical lens 19, and a photodetector 20. Optical head 38 further includes a servo mechanism, which is not shown, for tracking servo and focusing servo operations.

Plane of polarization rotating unit 12 includes two transparent electrode-attached glass plates 122, 122 and TN type liquid crystal 121 inserted therebetween, and if voltage is applied to the TN type liquid crystal using the transparent electrodes, a laser beam is directly transmitted without rotating the plane of polarization, while if no voltage is applied, the laser beam is transmitted with its plane of polarization rotated by 90°. The application of voltage is controlled by a liquid crystal driving circuit 32 provided outside the optical head. Liquid crystal driving circuit 32 will be later described.

Polarization selecting unit 13 has two glass plates 132 and 132, and a polarization film 131 inserted therebetween which transmits only a laser beam having plane of polarization in a particular direction, and polarization film 131 is provided at a part corresponding to the central part of the laser beam. It is assumed that polarization film 131 transmits only the laser beam that polarizes in the direction perpendicular to the plane of the sheet in this embodiment. The transmittance of polarization film 131 is from 70 to 90%, a filter 133 having a transmittance in the range from 70 to 90% without a polarization characteristic is provided at a part of polarization selecting unit 13 having no polarization film 131 provided and corresponding to the outer periphery of the laser beam.

A laser beam having a wavelength of 680 nm (tolerance: ±15 nm) emitted from semiconductor laser 10 is collimated into a parallel beam by collimator lens 11, has its plane of polarization selectively rotated by 90° or not rotated for transmission, and reaches polarization selecting unit 13. The laser beam is transmitted having its central part selectively shielded or not shielded at polarization selecting unit 13, and reaches objective lens 15 through half mirror 14. The laser beam collected by objective lens 15 is radiated upon a signal recording surface 16a through a transparent substrate 16.

The laser beam reflected upon signal recording surface 16a returns to half mirror 14 through transparent substrate 16 and objective lens 15, and half of the laser beam is reflected in the direction at 90° with respect to the incoming direction. The reflected beam is divided into three beams by Wollaston prism 17, and detected by photodetector 20 through collective lens 18 and cylindrical lens 19. Herein, among the three beams, the difference between the intensity of beams on both sides is detected as a reproduced signal, and the beam in the middle among the three beams is detected as an error signal.

The operation of optical head 38 shown in FIG. 6 at the time of recording a signal to magneto-optical recording medium 1 will be now described. When a signal is recorded to magneto-optical recording medium 1, TOC region 8A (FIG. 3) recorded on the starting end side of the track is reproduced prior to recording the signal.

Figure 7:
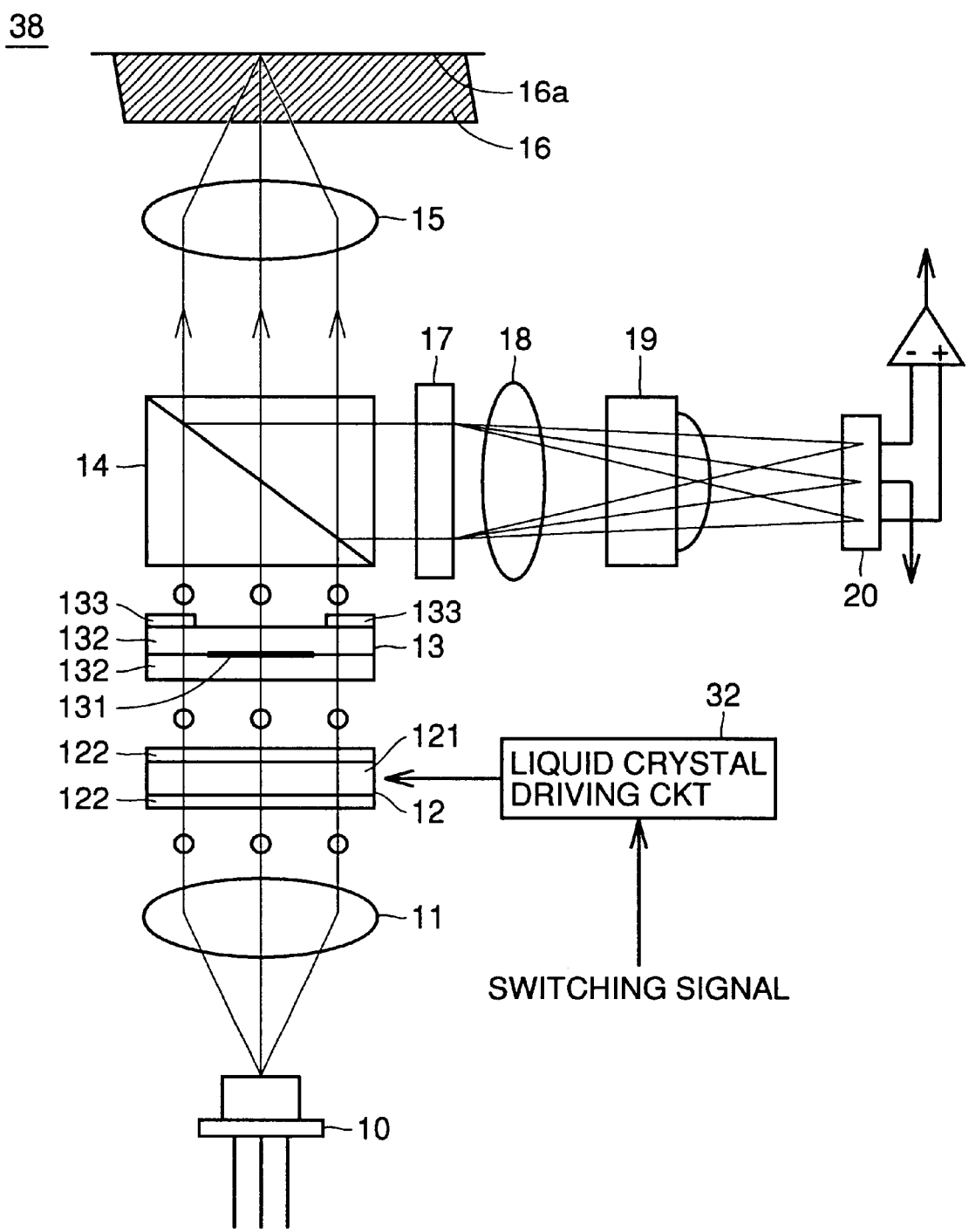
FIG. 7 is a diagram for use in illustration of the operation of reproducing by the optical head according to the first embodiment of the invention.

Referring to FIG. 7, the operation of optical head 38 at the time of reproducing information from TOC region 8A will be described. At the time of reproducing information from TOC region 8A, liquid crystal driving circuit 32 applies voltage to TN liquid crystal 121. As a result, a laser beam emitted from semiconductor laser 10 and polarized in the direction perpendicular to the plane of the sheet is entirely transmitted without having its plane of polarization rotated by plane of polarization rotating unit 12, and therefore the beam is not shielded by polarization selecting unit 13 and reaches objective lens 15 through half mirror 14. The laser beam focused by objective lens 15 is irradiated upon signal recording surface 16a through transparent substrate 16. The following operations are as described above in connection with FIG. 6, and therefore are not described.

Figure 8:
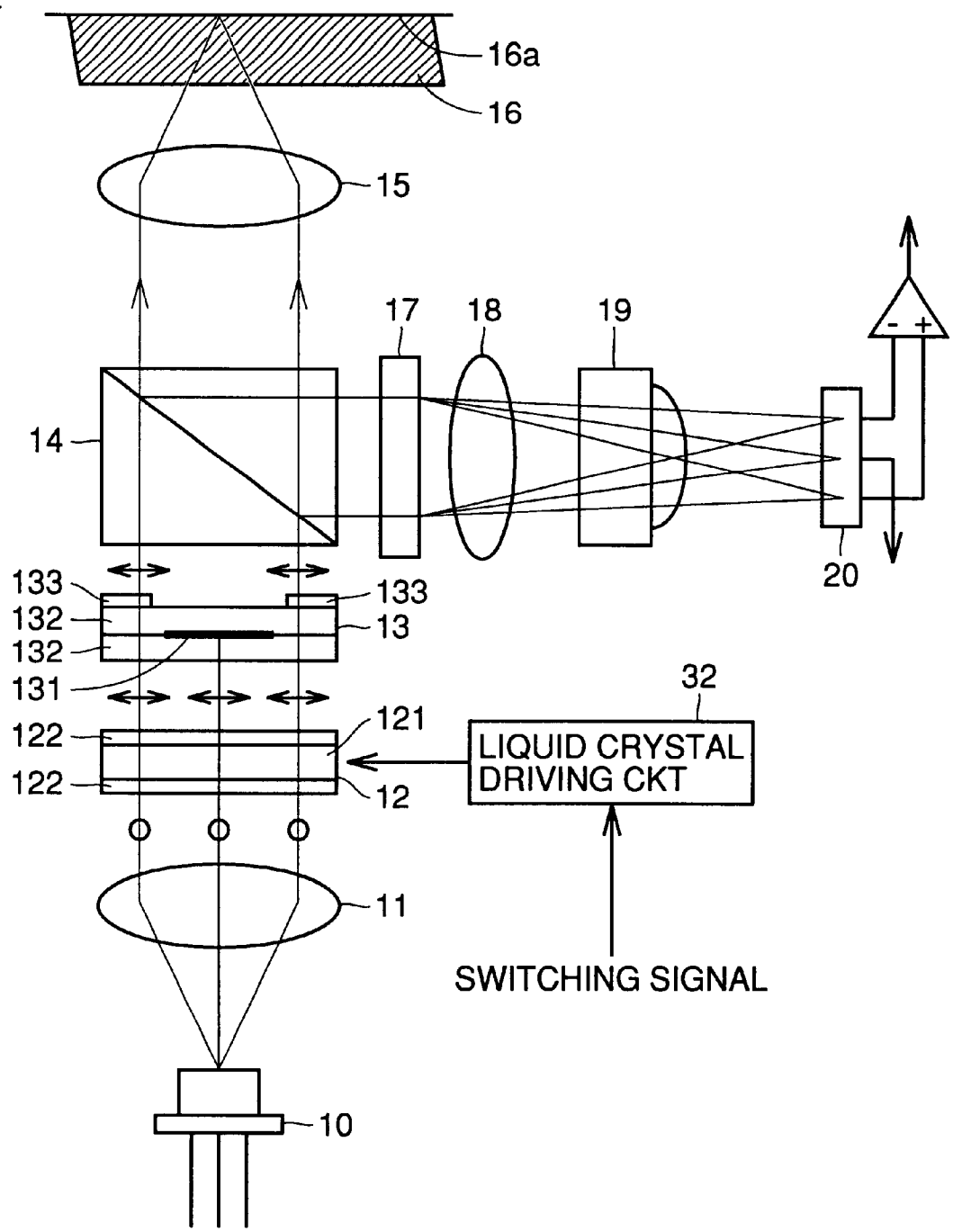
FIG. 8 is a diagram for use in illustration of the operation of recording/reproducing in the calibration region by the optical head according to the first embodiment of the invention.

Referring to FIG. 8, the operation of optical head 38 at the time of determining appropriate recording laser power in calibration region 8B will be now described. In this case, liquid crystal driving circuit 32 does not apply voltage to TN liquid crystal 121. As a result, a laser beam emitted from semiconductor laser 10 and polarized in the direction perpendicular to the plane of the sheet has its plane of polarization rotated by 90° by plane of polarization rotating unit 12, to be polarized in the direction parallel to the plane of the sheet for transmission, therefore the central part of the laser beam is shielded by polarization selecting unit 13, and only the outer periphery of the beam reaches objective lens 15 through half mirror 14. The laser beam focused by objective lens 15 is radiated upon signal recording surface 16a through transparent substrate 16. The following operations are described in connection with FIG. 6, and are not described.

In this case, the laser beam radiated upon signal recording surface 16a has its central part shielded, and therefore is divided into three beams, in other words a main beam and two side beams formed on both sides of the main beam by optical super-resolution. The intensity or diameter of each of the three beams is determined by the shielding ratio of the laser beam. In this embodiment, the shielding ratio is 25%, the intensities of the main beam and each of the side beams are 5 mW and 1.5 mW, respectively, and the beam diameters are 0.7 μm and 0.6 μm, respectively.

Figure 9:
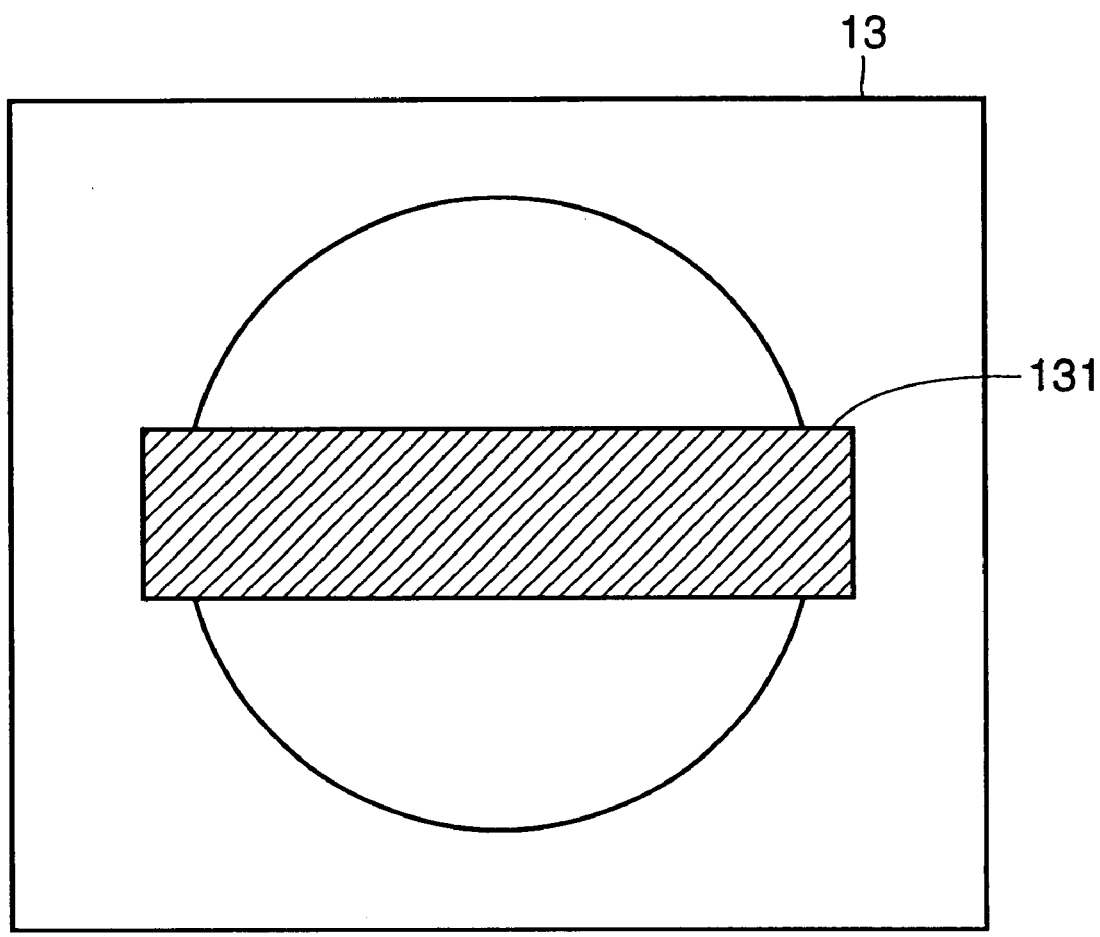
FIG. 9 is a cross sectional view of the polarization selecting unit of the optical head according to the first embodiment of the invention.

Polarization film 131 is provided in the direction parallel to the plane of the sheet as shown in FIG. 9, so that main beam L1 and two side beams L2 and L3 are radiated along the direction the same as the track direction. In this case, the shielding ratio is defined as the ratio of the width of polarization film 131 relative to the diameter of the laser beam. In this embodiment, the diameter of the laser beam is 2.0 mm, and therefore the width of polarization film is 0.5 mm.

A domain length recorded at the time of determining appropriate recording laser power in calibration region 8B is 2T for the NRZI (Non Return to Zero Inverse) modulation method. When a signal recorded by NRZI modulation is reproduced, and the domain length is shortened, in other words small domains are successively placed, individual domains will not be reproduced in practice. In such a case, signal processing is performed, assuming the shortest domain is reproduced. Therefore it is only necessary to determine laser power permitting of appropriate recording of a domain of a domain length 2T, the domain length shortest among the domains which actually permit reproducing.

Liquid crystal used for plane of polarization rotating unit 12 is not limited to the TN liquid crystal, but STN liquid crystal, or ferroelectric liquid crystal may be employed. The ferroelectric liquid crystal rotates the polarization direction of a laser beam by 45° in response to application of positive voltage for a short period of time, and holds the state. If negative voltage is applied for a short period of time, the liquid crystal rotates the polarization direction of the laser beam by 45° in the opposite direction to the case of applying the positive voltage, and holds the state. As a result, the difference of 90° is generated in the polarization direction of the laser beam after passage between applying positive voltage and negative voltage. Taking advantage of the principle, the polarization direction of a laser beam may be rotated by 90° by simply applying voltage for a short period of time, which saves energy.

The selection means used for polarization selecting unit 13 is not limited to the polarization film as described above, but may be polarization glass or polarization selective hologram. The polarization glass is produced by reducing the surface of glass in which a silver compound is oriented in a fixed direction, and precipitating silver therefrom as shown in FIG. 10, and the reduced silver film exhibits a polarization selective characteristic. Note that the material may be any of metals having polarization selectivity other than silver. Note however that the plane of polarization of the polarization glass using silver may transmit a laser beam almost 100%. An extinction film as shown in FIG. 6 is not necessary at the outer periphery of the laser beam, and therefore enough light is advantageously obtained when the flux of the laser beam is stopped down.

Figure 11:
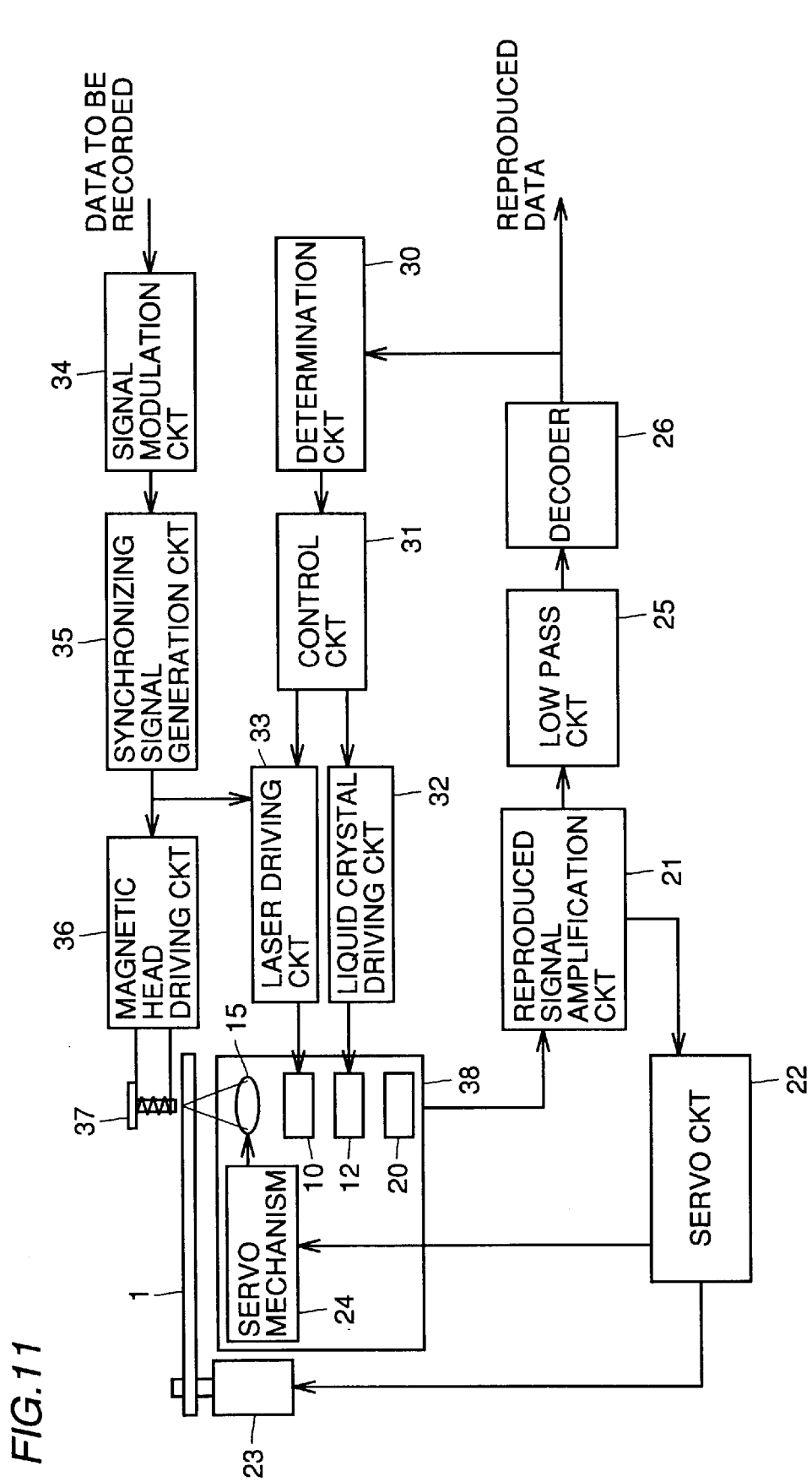
FIG. 11 is a schematic block diagram of an information recording/reproducing apparatus according to the first embodiment of the invention.

Referring to FIG. 11, the whole structure of an information recording/reproducing apparatus for recording or reproducing information to/from magneto-optical recording medium 1 according to an embodiment of the invention will be now described. As shown in FIG. 11, the information recording/reproducing apparatus includes an optical head 38, a reproduced signal amplification circuit 21, a servo circuit 22, a spindle motor 23, a low pass circuit 25, a decoder 26, a determination circuit 30, a control circuit 31, a liquid crystal driving circuit 32, a laser driving circuit 33, a signal modulation circuit 34, a synchronizing signal generation circuit 35, a magnetic head driving circuit 36, and a magnetic head 37. Optical head 38 is mainly formed of objective lens 15, semiconductor laser 10, plane of polarization rotating unit 12, photodetector 20 and servo mechanism 24 (not shown in FIGS. 6 to 8) as described above.

Referring to FIG. 11, the recording operation to magneto-optical recording medium 1 will be now described. Before recording data to data region 8C (FIG. 3), TOC information is reproduced from TOC region 8A (FIG. 3). At the time, the reflection of a laser beam radiated upon the signal recording surface 16a of magneto-optical recording medium 1 by objective lens 15 is detected as a reproduced signal and an error signal by photodetector 20. The reproduced signal and error signal detected by photodetector 20 are sent to reproduced signal amplification circuit 21, amplified, and then sent to low pass circuit 25 and servo circuit 22, respectively.

The reproduced signal sent to low pass circuit 25 is integrated, then provided to decoder 26 and supplied as reproduced data. Meanwhile, servo circuit 22 is responsive to the error signal sent from reproduced signal amplification circuit 21 to rotate spindle motor 23 at a prescribed number of revolution, and controls servo mechanism 24 in optical head 38, so that servo mechanism 24 executes a tracking servo operation and a focusing servo operation by driving objective lens 15.

When the optical head then reaches calibration region 8B (FIG. 3), recording data to record a domain in a fixed size is applied to signal modulation circuit 34, and subjected to NRZI (Non Return to Zero Inverted) modulation. The NRZI-modulated recording data is superposed with a synchronizing signal for pulsing an applied magnetic field and a laser beam at the time of recording by a synchronizing signal generation circuit 35. Then, the recording data superposed with the synchronizing signal is sent to magnetic head driving circuit 36 and laser driving circuit 33, magnetic head driving circuit 36 drives magnetic head 37 to generate a prescribed pulse-shaped magnetic field based on the superposed synchronizing signal, and laser driving circuit 33 drives semiconductor laser 10 in optical head 38 to pulse a laser beam at a prescribed cycle.

Control circuit 31, upon detecting the end of reproduction of TOC region 8A, controls liquid crystal driving circuit 32 not to apply voltage to TN liquid crystal 121 (FIG. 6) in plane of polarization rotating unit 12, the voltage which has been applied during reproducing TOC region 8A, in order to generate three beams to be radiated upon calibration region 8B. Liquid crystal driving circuit 32 cuts off voltage which has been applied to TN liquid crystal 121, based on an instruction from control circuit 31. Thus, in calibration region 8B, three beams, that is, main beam L1 as well as two side beams L2 and L3 on both sides of the main beam are radiated by the optical head, and a signal is recorded by main beam L1.

Immediately after the signal is recorded by main beam L1, photodetector 20 in the optical head detects the reflection from side beam L3 following main beam L1 as a reproduced signal. The configuration of photodetector 20 will be later described. The reproduced signal from photodetector 20 is amplified by reproduced signal amplification circuit 21, and then sent to low pass circuit 25. The reproduced signal integrated at low pass circuit 25 is sent to decoder 26. The output of decoder 26 is sent to determination circuit 30, and as described in connection with FIG. 5B, it is determined whether or not the relation A>B(C>D) is satisfied wherein A, B, C and D are the amplitudes of the reproduced signal at time points a, b, c and d, respectively.

The result of determination is sent to control circuit 31, which then controls laser driving circuit 33 to change the power of the laser beam if the relation A>B(C>D) is not satisfied. Laser driving circuit 33 drives semiconductor laser 10 to increase or reduce the laser power in response to an instruction from control circuit 31. More specifically, if it is determined that the amplitude of a reproduced waveform is a reproduced waveform 54 shown in FIG. 5(a), the power of the laser beam is increased, while if the amplitude of the waveform is a reproduced waveform 58 shown in FIG. 5B, the power of laser beam is reduced. By repeating the process, recording laser power which permits the amplitude of a reproduced signal to satisfy the relation A>B(C>D) (a reproduced waveform 56 shown in FIG. 5B) is determined before optical head 38 passes calibration region 8B.

When optical head 38 reaches data region 8C (FIG. 3), semiconductor laser 10 emits a laser beam at a power level appropriate for recording determined in calibration region 8B. Recording data to be recorded is NRZI-modulated at signal modulation circuit 34, superposed with a prescribed synchronizing signal at synchronizing signal generation circuits 35, and drives magnetic head driving circuit 36 and laser driving circuit 33. Thus, a signal is recorded to magneto-optical recording medium 1 by a magnetic field and a pulse laser at a prescribed cycle.

Referring to FIG. 11, the operation of reproducing data from a magneto-optical recording medium will be described. Before reproducing data from data region 8C, TOC information is reproduced from TOC region 8A. At the time, the reflection of a laser beam radiated upon signal recording surface 16a on magneto-optical recording medium 1 by objective lens 15 is detected as a reproduced signal and an error signal by photodetector 20. The reproduced signal and error signal detected by photodetector 20 are sent to reproduced signal amplification circuit 21, amplified, and then sent to low pass circuit 25 and servo circuit 22, respectively. The reproduced signal sent to low pass circuit 25 is integrated and sent to decoder 26, and then supplied as reproduced data. Servo circuit 22 rotates spindle motor 23 at a prescribed number of revolution based on the error signal sent from reproduced signal amplification circuit 21, and controls servo mechanism 24 in the optical head, and servo mechanism 24 executes a tracking servo operation and a focusing servo operation by driving objective lens 15.

Then, when optical head 38 reaches calibration region 8B, a laser beam having its power sequentially changed to determine appropriate reproducing laser power is radiated upon a recording region of an appropriate shape formed at the time of recording as shown in FIG. 5B or to a recording region for reproducing calibration previously formed to have a shape as shown in FIG. 5B, and then the property of reproducing is evaluated.

In calibration region 8B, the optical super-resolution method is not applied unlike the time of recording, and the central part of the laser beam is not shielded. More specifically, liquid crystal driving circuit 32 continues to apply voltage to plane of polarization rotating unit 12 in optical head 38. Laser driving circuit 33 drives semiconductor laser 10 by initial laser power, and the reflection of the laser beam reflected through objective lens 15 is detected as a reproduced signal by photodetector 20. The reproduced signal is amplified at reproduced signal amplification circuit 21, and then sent to low pass circuit 25. The reproduced signal integrated by low pass circuit 25 is sent to decoder 26. The output of decoder 26 is sent to determination circuit 30, and it is determined whether or not the relation A>B(C>D) is satisfied wherein A, B, C and D are the amplitudes of the reproduced signal at time points a, b, c, and d, respectively.

The result of determination is sent to control circuit 31, which then controls laser driving circuit 33 to increase or reduce the power of the laser beam if the relation A>B(C>D) is not satisfied. The operation of control circuit 31 in this case is the same as the operation of control circuit 31 at the time of recording. The evaluation of the waveform of a reproduced signal is repeated while increasing or reducing the power of the laser beam, and the reproducing laser power which permits the amplitudes of the reproduced signal to satisfy the relation A>B(C>D) (in reproduced waveform 56 shown in FIG. 5B) is determined before optical head 38 passes calibration region 8B.

Then, when the optical head reaches data region 8C, semiconductor laser 10 emits a laser beam at a power level determined in calibration region 8B and appropriate for reproducing, and a signal recorded in data region 8C is reproduced. Thus, the signal may be reproduced at a reproducing laser power level appropriate for a magneto-optical recording medium to reproduce data therefrom.

Figure 12:
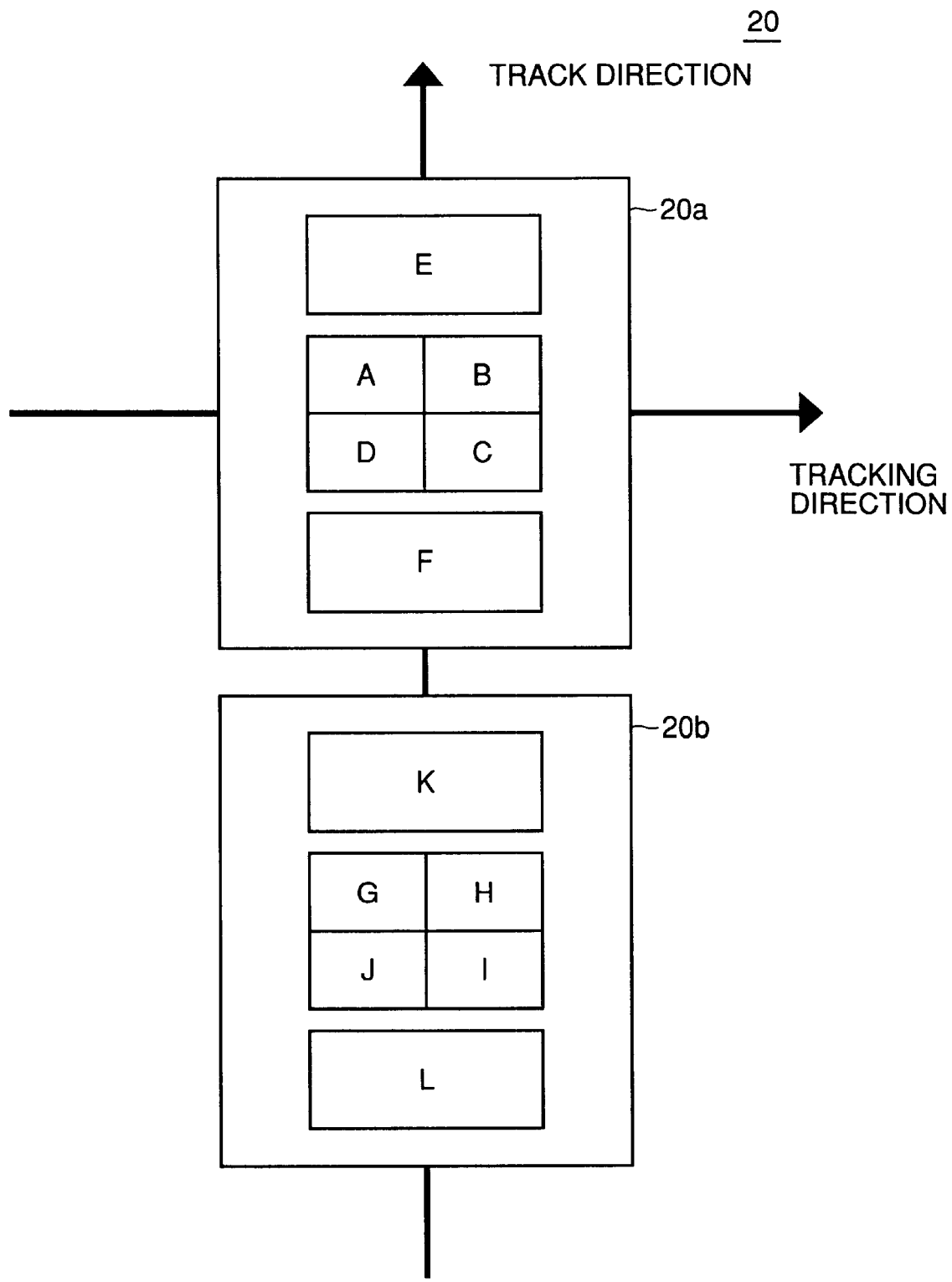
FIG. 12 is a schematic diagram showing detection patterns by a photodetector 20 according to the first embodiment of the invention.

Patterns of photodetector 20 capable of recording by main beam L1 and reproducing by side beam L3 in parallel, using three laser beams according to the optical super-resolution method as described above will be now described in conjunction with FIG. 12.

Photodetector 20 includes two photodetection units 20a, 20b provided adjacent to each other in the track direction, and each unit is divided into 6 portions. Photodetection unit 20a is provided to detect the reflection of main beam L1, while photodetection unit 20b is provided to detect the reflection of side beam L3.

Main beam L1 and side beam L3 are each divided into three kinds of light, in other words light including only the P-polarized component, light including only the S-polarized component, and light including both P-polarized component and S-polarized component by Wollaston prism 17. Among these three kinds of light generated from the reflection of main beam L1, the light including only the P-polarized component is detected in a region E, the light including only the S-polarized component is detected in a region F, and the light including both P-polarized component and S-polarized component is detected in regions A, B, C, and D in photodetection unit 20a. Among the three kinds of light generated from the reflection of side beam L3, the light including only the P-polarized component is detected in a region K, the light including only the S-polarized component is detected in a region L, and light including both P-polarized component and S-polarized component is detected in regions G, H, I and J in photodetection unit 20b.

Herein, in calibration region 8B, a signal is recorded by main beam L1 while a recorded signal is reproduced by side beam L3 using these three kinds of laser beams as shown in FIG. 4, the detection of main beam L1 by photodetection unit 20a is not performed, and only side beam L3 is detected by photodetection unit 20b. Photodetection unit 20a is used for reproducing a signal recorded in data region 8C by a normal single beam without using the optical super-resolution method. As described above, by providing two units, that is, photodetection unit 20a for the main beam and photodetection unit 20b for the side beams, along the track direction, signal recording by the main beam according to the optical super-resolution method and reproducing by the side beams may be performed in parallel.

Note that, in the embodiment shown in FIG. 11, liquid crystal driving 1circuit 32 and laser driving circuit 33 controlled by control circuit 31 drive plane of polarization rotating unit 12 and semiconductor laser 10, respectively, but control circuit 31 may directly control semiconductor laser 10 and plane of polarization rotating unit 12 in optical head 38.

As in the foregoing, according to the first embodiment of the invention, appropriate recording or reproducing laser power may be determined by using the region between the TOC region and data region on the track of a magneto-optical recording medium as a calibration region for laser power and forming wobbles in the calibration region to monitor the state of amplitude modulation of a reproduced signal waveform therefrom.

Second Embodiment

Figure 13:
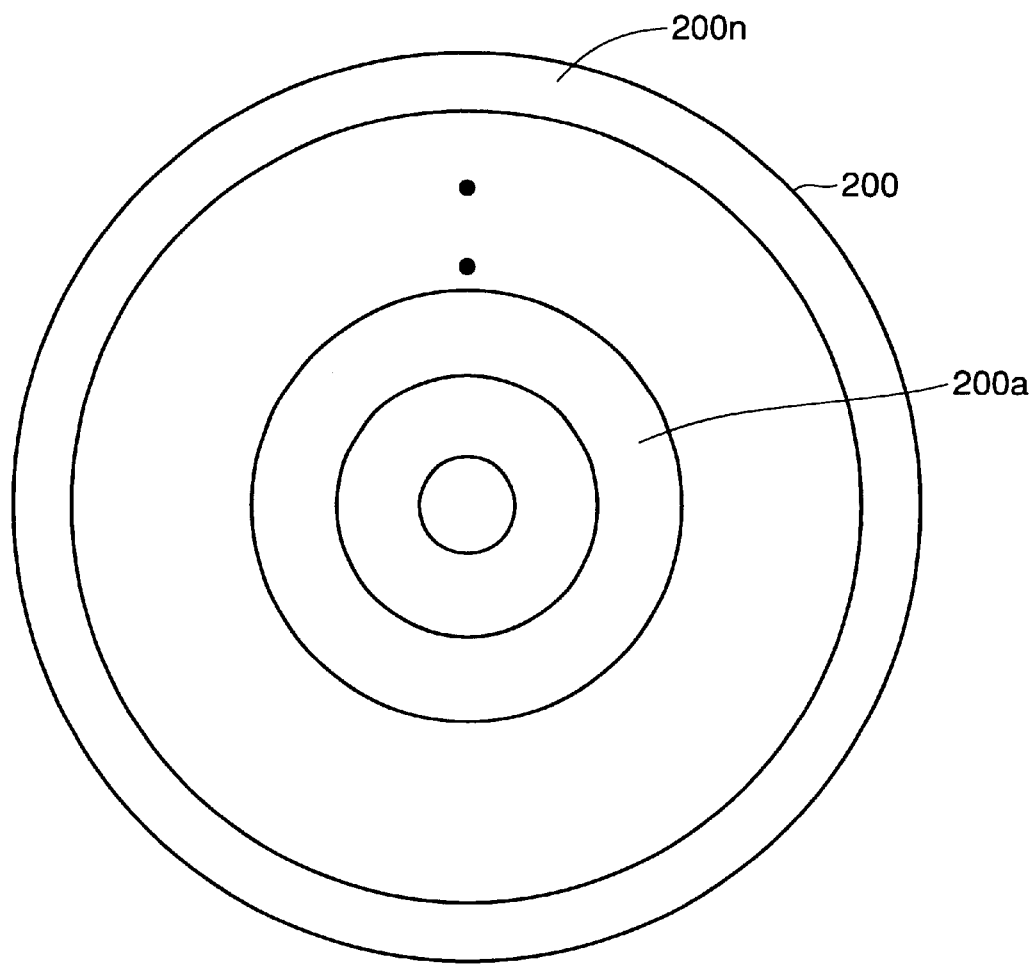
FIG. 13 is a plan view of a magneto-optical recording medium according to a second embodiment of the invention.

In the first embodiment, as shown in FIG. 2, calibration of laser power at the time of recording or reproducing in a magneto-optical recording medium 1 having a single spiral track is described. In a second embodiment, a magneto-optical recording medium 200 divided into a plurality of zones 200a, ..., 200n, each formed of 60 tracks, as shown in FIG. 13, and calibration of laser power on a zone basis at the time of recording or reproducing will be described.

In the following second embodiment, magneto-optical recording medium 200 is a super-resolution magneto-optical recording medium.

Figure 14:
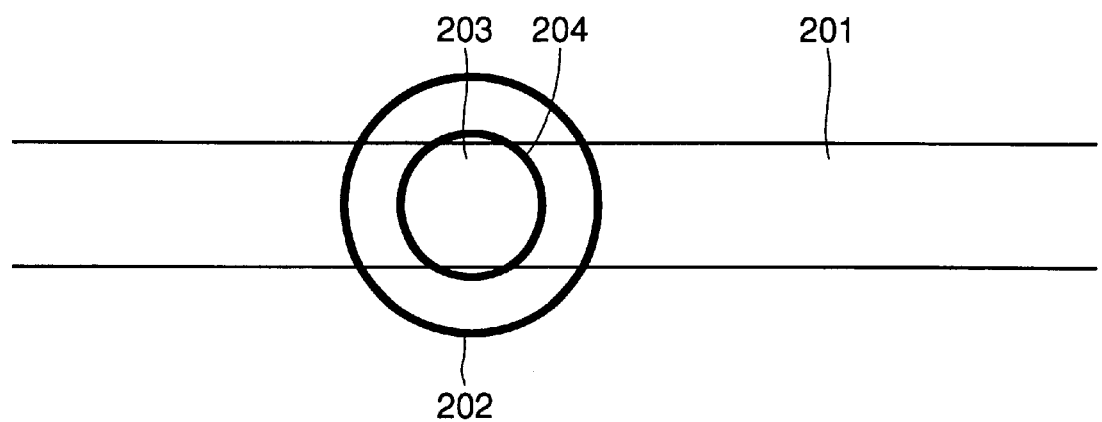
FIG. 14 is a diagram showing the relation between a reproducing beam, a reproducing window and a track in a super-resolution magneto-optical recording medium according to the second embodiment of the invention.

Referring to FIG. 14, in super-resolution magneto-optical recording medium 200, a signal recorded in a recording layer is reproduced through a reproduction window 203 smaller than the diameter of reproducing beam 202. Note that circle 204 represents the range of a laser beam 202 having an intensity to raise the temperature of magneto-optical recording medium 200 to a level higher than a prescribed temperature. If the diameter of reproduction window 203 is smaller than the width of track 201, a reproduced signal may be obtained in a rate-controlled manner only by the diameter of reproduction window 203 without the influence of the shape of track 201 (such as wobbles). In order to optimize reproducing laser power by evaluating the degree of modulation of a signal waveform, the power of the laser beam should be increased such that the diameter of reproduction window 203 is about as large as the width of track 201.

Figure 15A:
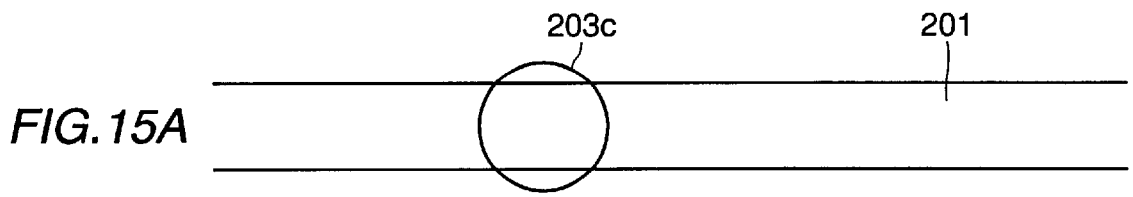
FIGS. 15A to 15C are schematic diagrams showing the relation between the diameter of the reproducing window and the track when the power of the laser beam changes in the super-resolution magneto-optical recording medium according to the second embodiment of the invention.
Figure 15B:
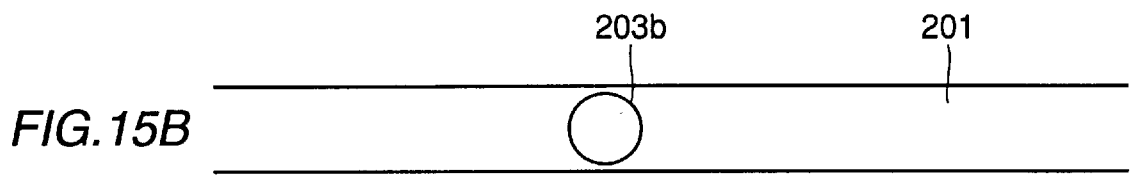
Figure 15C:
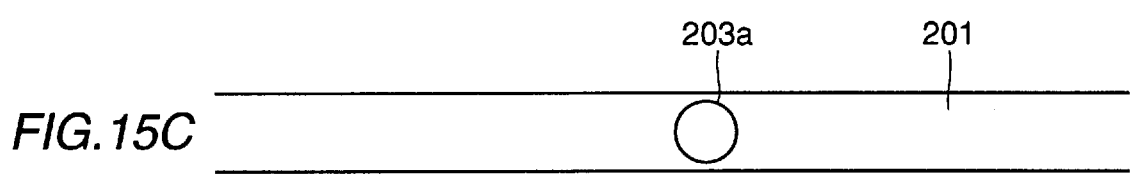

More specifically, referring to FIGS. 15A to 15C, if the power of the laser beam is small, the diameter of the beam is smaller than the width of track 201 like reproduction window 203a, and as the power increases, the diameter increases like reproduction windows 203b and 203c. In particular, the diameter of reproduction window 203c is larger than the width of track 201, and it may be accurately determined whether or not the laser power at the time of reproducing is appropriate, by detecting a signal reproduced from a signal recorded in this state and evaluating the degree of modulation. As a result, in the second embodiment, it is determined whether or not the reproducing power is appropriate by increasing the power of the laser beam from the state of reproduction window 203a to the state of reproduction window 203c.

The process of determination will be described in more detail by referring to FIGS. 16A to 16C. When a reproduction laser beam is radiated upon calibration region 150 in which wobbles 151 are formed in the track at a prescribed frequency, and the power of the laser beam is small as shown in FIG. 16A, a region 152, the temperature of which is raised higher than a prescribed temperature, is fixed to be smaller than the width defined by the raised and recessed portions of the track or land. Therefore, the waveform of a detected signal 153 has a fixed amplitude. If the power of the laser beam increases, and a region 154, the temperature of which is raised higher than a prescribed temperature, projects from the region defined by the width of the land as shown in FIG. 16B, a detected signal 155 has a waveform, the amplitude of which periodically changes by the influence of wobbles. If the power of the laser beam is further increased, as shown in FIG. 16C, a region 156, the temperature of which is raised higher than a prescribed temperature, greatly projects from the region defined by the width of the land, and a resulting reproduced signal 157 has a waveform, the amplitude of which is larger than the width of the land and fixed. Therefore, in the second embodiment, it is determined whether or not the reproducing laser power is optimum based on the presence/absence of detection of waveform 155 shown in FIG. 16B. Note that in FIGS. 16A to 16C, the laser beam is radiated upon the track formed on the land, optimum reproduction laser power may be similarly determined if the laser beam is radiated upon a track formed on a groove.

Recording laser power at the time of recording a signal to super-resolution magneto-optical recording medium 200 may be similarly optimized. In this case, the laser power at the time of recording may be optimized by recording a signal to the calibration region while changing the power from the level at which the diameter of a region whose temperature is raised higher than a prescribed temperature is smaller than the width of a land (or groove) to the level at which the diameter is larger than the width of the land (or groove), and by determining change in the amplitude of a reproduced signal formed by reproducing thus recorded signal. More specifically, whether or not the laser power used for recording a signal is appropriate may be determined based on the presence/absence of detection of waveform 155 shown in FIG. 16B.

The method of determining optimum power shown in FIGS. 16A to 16C may be applied in place of the method of determining shown in FIG. 5A to 5C in the first embodiment.

Figure 17A:
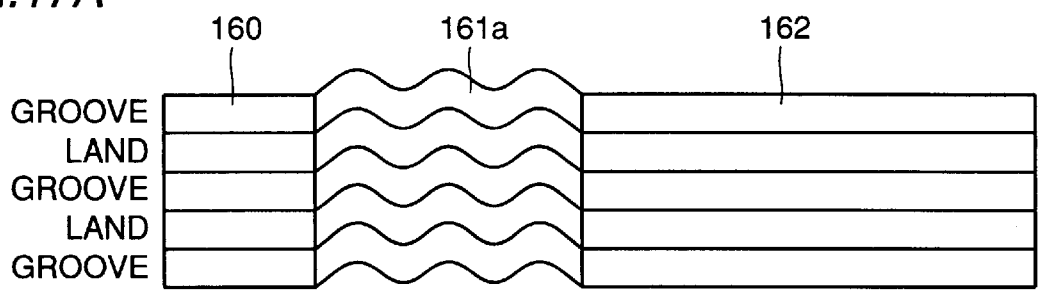
FIGS. 17A to 17C show the structure of a calibration region according to the second embodiment of the invention.
Figure 17B:
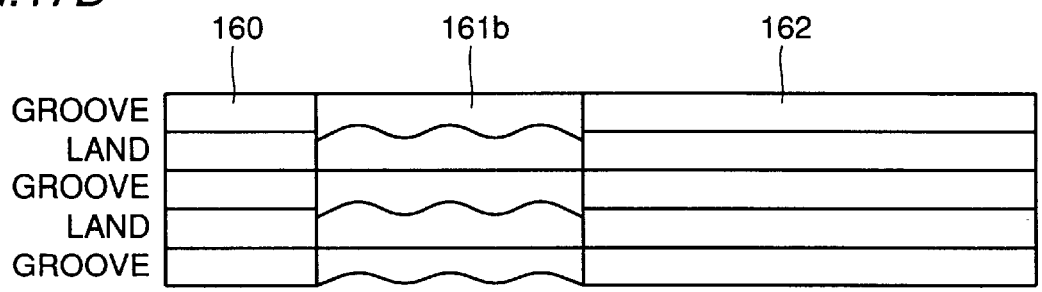
Figure 17C:
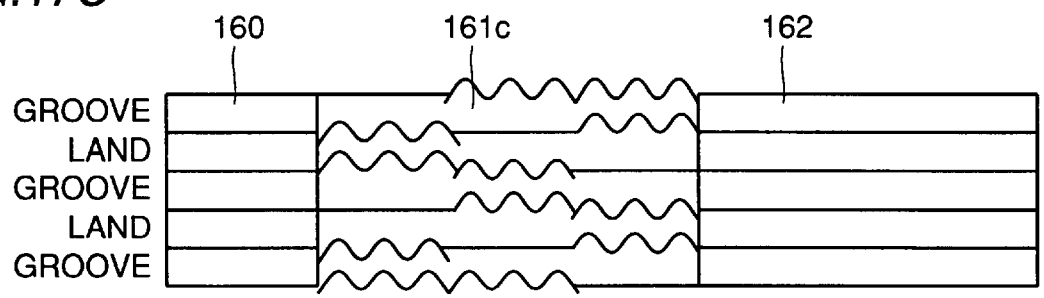

Referring to FIGS. 17A to 17C, how a wobble is formed in the calibration region will be described. As shown in FIGS. 17A to 17C, the calibration region is present between TOC (address) region 160 and data region 162, and may have a structure 161a in which wobbles are formed in a sin curve on both sidewalls of a groove as shown in FIG. 17A, or a structure 161b in which a wobble is formed in a sin curve at one wall of a groove as shown in FIG. 17B, or a structure 161c in which wobbles are formed on both sidewalls or one wall of a groove at a part of the calibration region as shown in FIG. 17C.

Figure 18A:
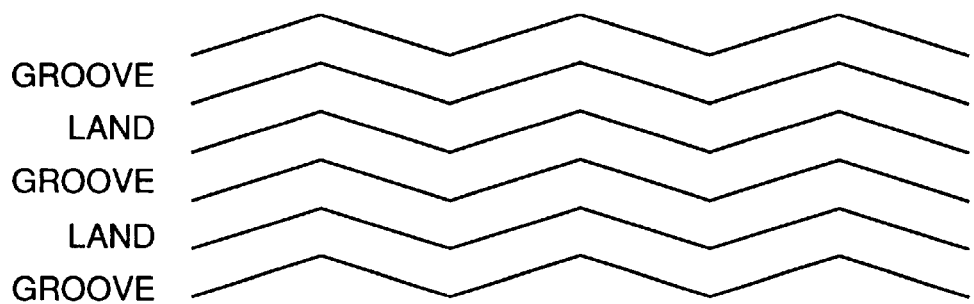
FIGS. 18A to 18C are schematic diagrams of the shape of wobbles formed in the calibration region according to the second embodiment of the invention.
Figure 18B:
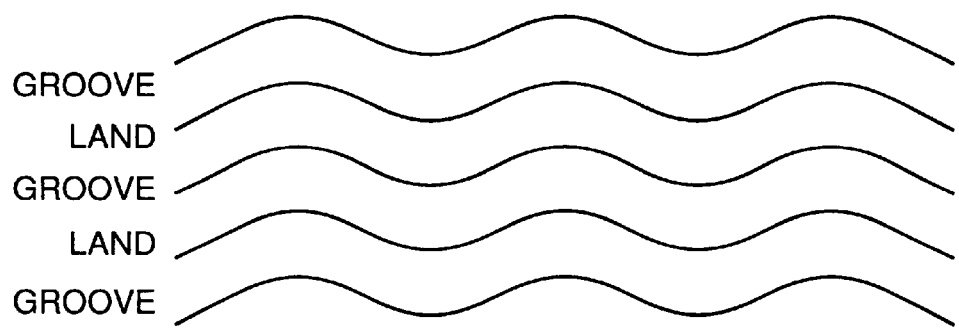
Figure 18C:
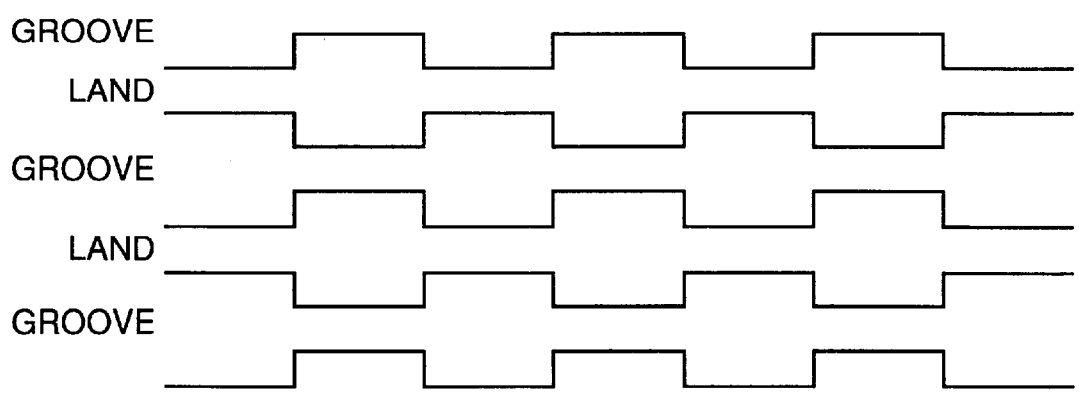

Referring to FIGS. 18A to 18C, wobbles formed in each of structures 161a, 161b and 161c in the calibration region will be now described. The shape of wobbles may be serrate as shown in FIG. 18A, in a sin curve as shown in 18B, or a rectangular waveform as shown in FIG. 18C. Wobbles in each of these shapes are formed at a frequency in the range from 0.01 to 2 MHz.

Figure 19:
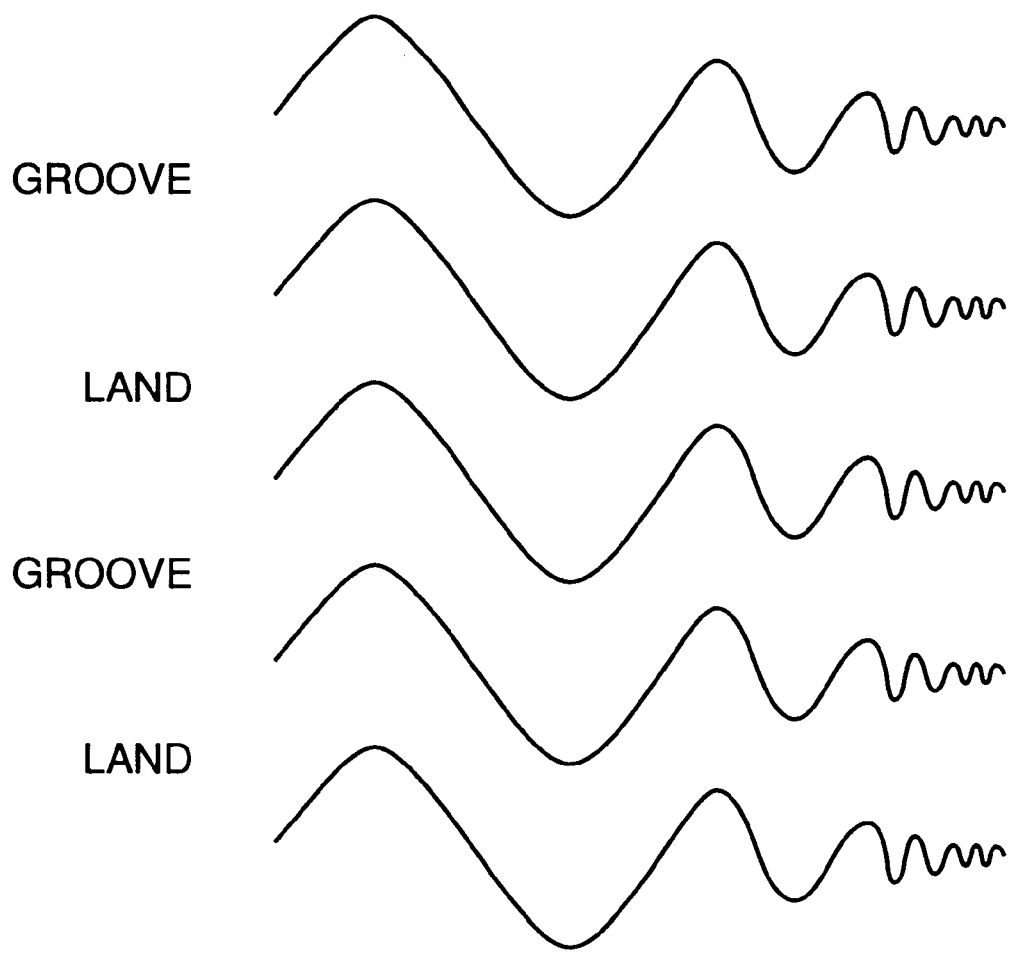
FIG. 19 is a schematic diagram of another shape of wobbles formed in the calibration region according to the second embodiment of the invention.
Figure 20A:
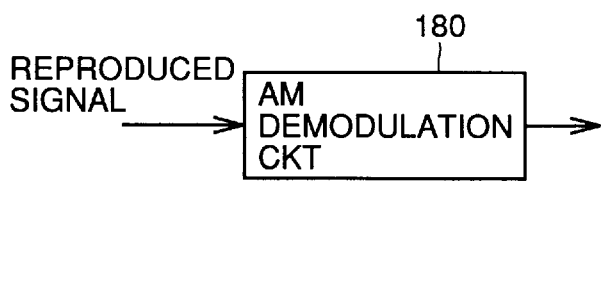
FIGS. 20A and 20B show an example of a detection circuit for detecting the waveform of a reproduced signal according to the second embodiment of the invention.
Figure 20B:
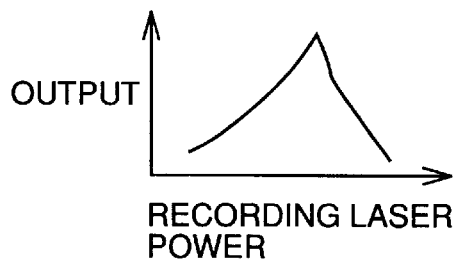

Furthermore, the shapes of wobbles are not limited to those shown in FIGS. 18A to 18C, and may be as shown in FIG. 19. In the shape shown in FIG. 19, the frequency is lower for larger amplitudes of wobbles, and higher for smaller amplitudes.

In addition, recording laser power may be optimized while recording signals at different frequencies to adjacent groove and land. In this case, assuming that the frequency of a signal recorded to a certain groove is $f_1$, and that the frequency of a signal recorded to a land next to the groove is $f_2$, frequencies $f_1$ and $f_2$ should be selected to satisfy the relation $f_1 - f_2 \geq$ (the frequency of wobbles). More preferably, frequencies $f_1$ and $f_2$ should be selected to satisfy the relation $|f_1 - f_2| \geq$ (the frequency of wobbles).

Note that the structure of the calibration region and the shape of wobbles formed in the calibration region shown in FIGS. 17, 18 and 19 may be applied to the calibration region and wobbles according to the first embodiment of the invention.

Optimization of recording power and reproducing power in the calibration region having wobbles of each of the above described shapes is performed using the optical head disclosed in connection with the first embodiment. More specifically, when the recording laser power is optimized, a laser beam formed of a main beam and two side beams is radiated upon the calibration region in the track direction, and immediately after a signal is recorded by the main beam, the signal is reproduced by one of the two side beams, and it is determined whether or not the waveform of the reproduced signal is waveform 155 in FIG. 16B. In optimization of the reproducing laser power, one beam is radiated upon the calibration region, and it is determined whether or not the waveform of a reproduced signal is waveform 155 shown in FIG. 16B.

Herein, in optimizing the reproducing power, the power shown in FIG. 16A is 2.0 mW, the power in FIG. 16B is 2.3 mW, and the power in FIG. 16C is 2.8 mW. Note that in a super-resolution magneto-optical recording medium, the smaller the reproducing window, the higher could be the density of reproduction, and therefore the lower limit of the reproducing power may be set to a power level lower than 2.0 mW in FIG. 16A. For example, if the lower limit of the reproducing power to form a reproducing window is set at 1.8 mW, the level of a reproduced signal is fixed as is the case in FIG. 16A with this 1.8 mW power level, while the resolution is higher since the diameter of the window is smaller, and the condition is not necessarily disadvantageous. Therefore, the lower limit of the optimum range of the reproducing laser power is set to the range from 1.8 mW to 2.8 mW, which is slightly under level.

The information recording/reproducing apparatus according to the first embodiment described in conjunction with FIG. 11 is used as an information recording/reproducing apparatus according to the second embodiment, and optimization of the recording laser power and the reproducing laser power is performed similarly to the case shown in FIG. 11.

In the second embodiment, there are two methods as follows for detecting waveform 155 shown in FIG. 16B in determination circuit 30 in FIG. 11. Referring to FIGS. 20A and 20B, and FIGS. 21A and 21B, the methods of detecting waveform 155 will be now described.

One of the two methods is an AM detection method, and the other is a synchronizing detection method.

In the AM detection method, a reproduced signal is input to an AM demodulation circuit 180, which then detects the intensity of the waveform of the obtained reproduced signal, and determines whether or not the intensity changes periodically. If the detected intensity changes periodically, the recording laser power is determined as optimum at the maximum level of the intensity. This also applies to optimization of the reproducing laser power.

Figure 21A:
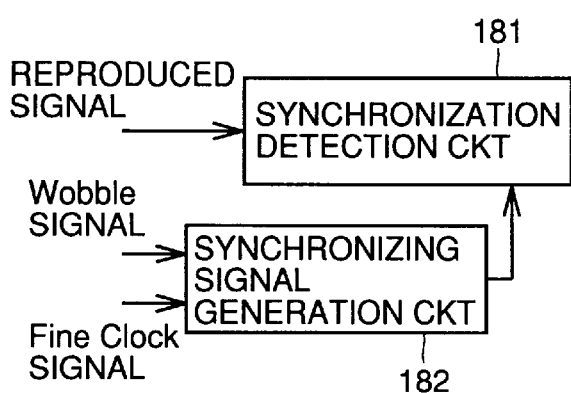
FIGS. 21A and 21B show another example of a detection circuit for detecting the waveform of a reproduced signal according to the second embodiment of the invention.
Figure 21B:
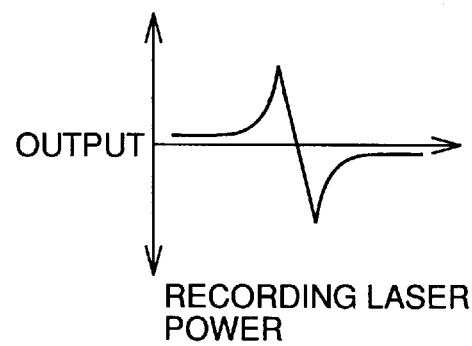

If the intensity of the amplitude of a reproduced signal waveform is periodically detected and compared at each cycle as described above, a synchronizing signal for detecting the intensity of the reproduced waveform is necessary. To this end, the synchronizing detection method is employed. As shown in FIG. 21A, in the synchronizing detection method, a reproduced signal is inputted to synchronizing detection circuit 181. Meanwhile, a fine clock mark formed as a wobble at a magneto-optical recording medium is detected by synchronizing signal generation circuit 182, which then generates a synchronizing signal by referring to the detected fine clock mark and applies the resultant signal to synchronizing detection circuit 181. Synchronizing detection circuit 181, upon receiving the synchronizing signal, detects the amplitude of the reproduced signal for each synchronizing signal, compares the amplitudes as described above, and optimizes laser power at the time of recording or reproducing.

Figure 22:
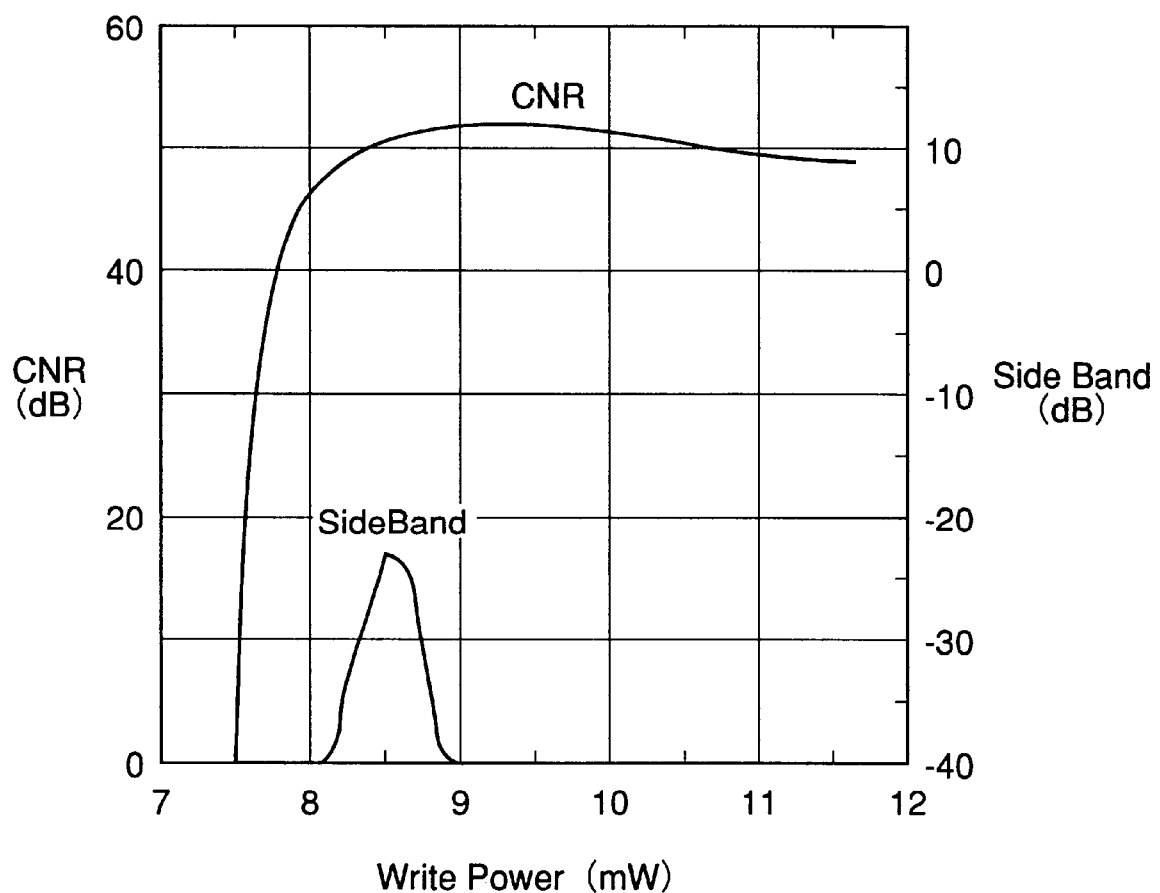
FIG. 22 is a graph showing the relation between the recording laser power and the CN ratio of a reproduced signal according to the second embodiment of the invention.

Referring to FIG. 22, the CN ratio (CNR) of a reproduced signal relative to recording power will be described. As the recording power increases, the CN ratio of the reproduced signal thereto increases, and the CN ratio of the reproduced signal becomes substantially fixed at the recording power level equal to or higher than 8 mW. A sideband of the reproduced signal is observed while the recording power is in the range from 8 to 9 mW, this is because a region the temperature of which is raised equal to or higher than a prescribed temperature by the laser beam expands, which is reflected upon the reproduced signal. It is therefore determined that the recording power in the region at which the sideband appears is determined as optimum power.

Figure 23:
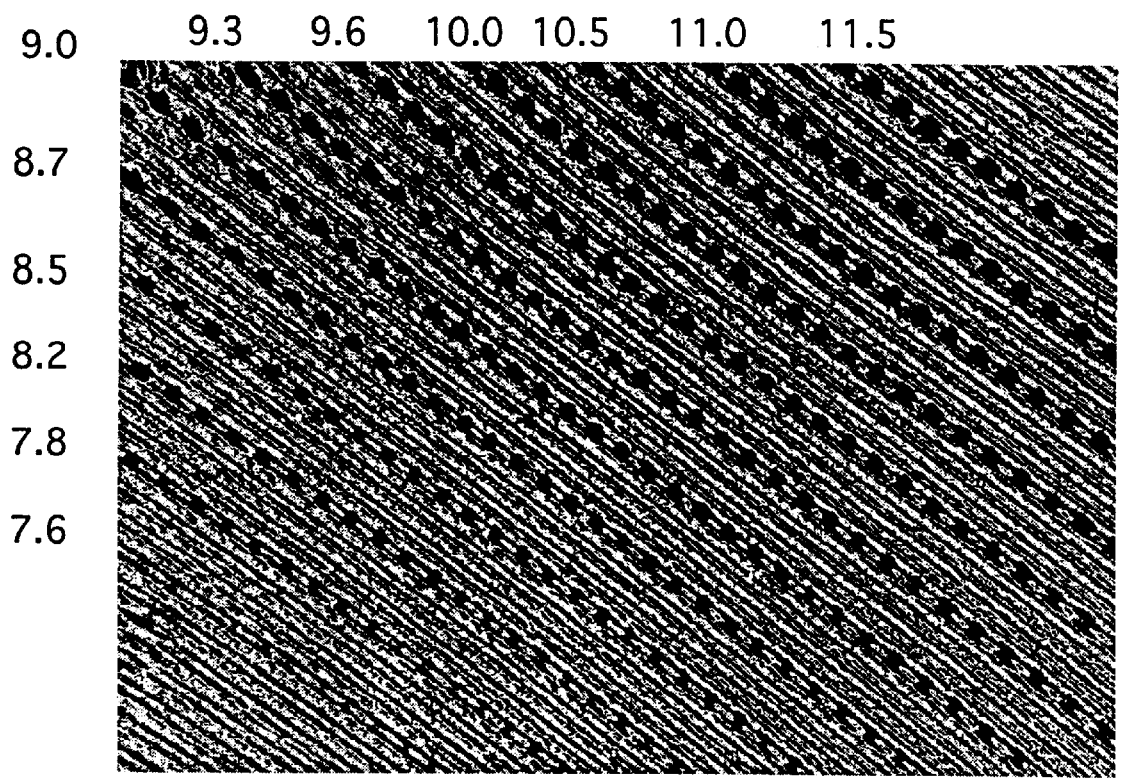
FIGS. 23 shows the state of a magneto-optical recording medium photographed using a polarizing microscope when recording power is changed according to the second embodiment of the invention.

FIG. 23 shows the state of a recording surface on a magneto-optical recording medium photographed using a polarizing microscope, in which a signal is recorded while changing the recording laser power. As can be seen, as the recording power increases, a larger domain (dark portion in the photograph) is formed.

Figure 24:
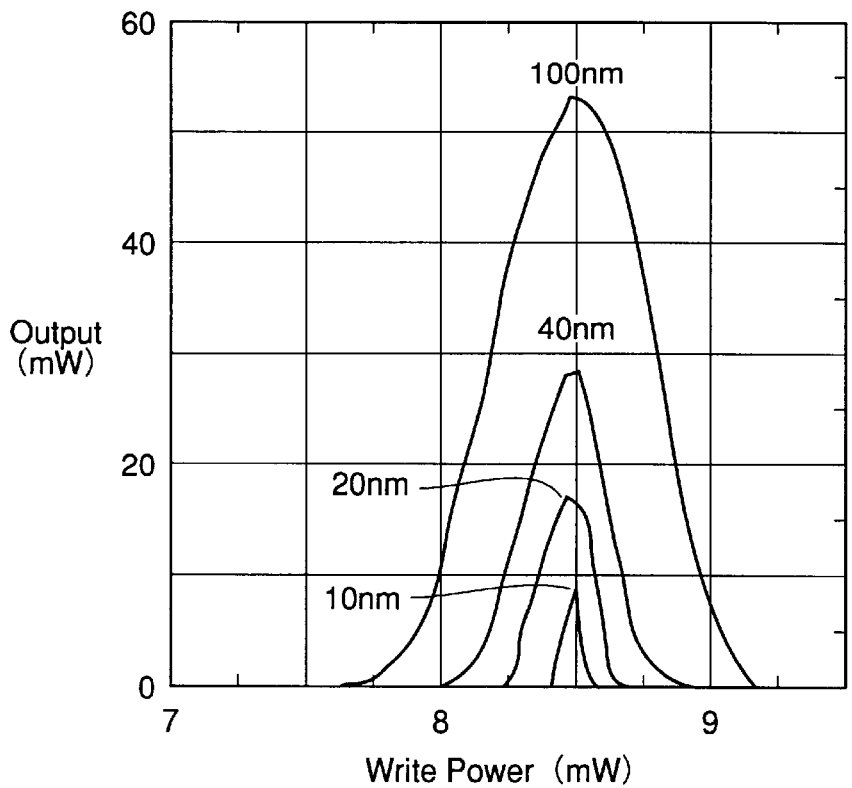
FIG. 24 is a graph showing the relation between recording laser power and the sideband of a reproduced signal when the amplitude of wobbles is changed according to the second embodiment of the invention.

Referring to FIG. 24, the relation between recording power and the sideband of a reproduced signal when the amplitude of wobbles is used a parameter will be now described. As shown in FIG. 22, a sideband appears in the reproduced signal at the recording laser power in the range from 8 to 9 mW, the sideband increases as the amplitude of wobbles increases. In the second embodiment, the amplitude of wobbles in the range from 10 to 100 nm is appropriate.

Figure 25:
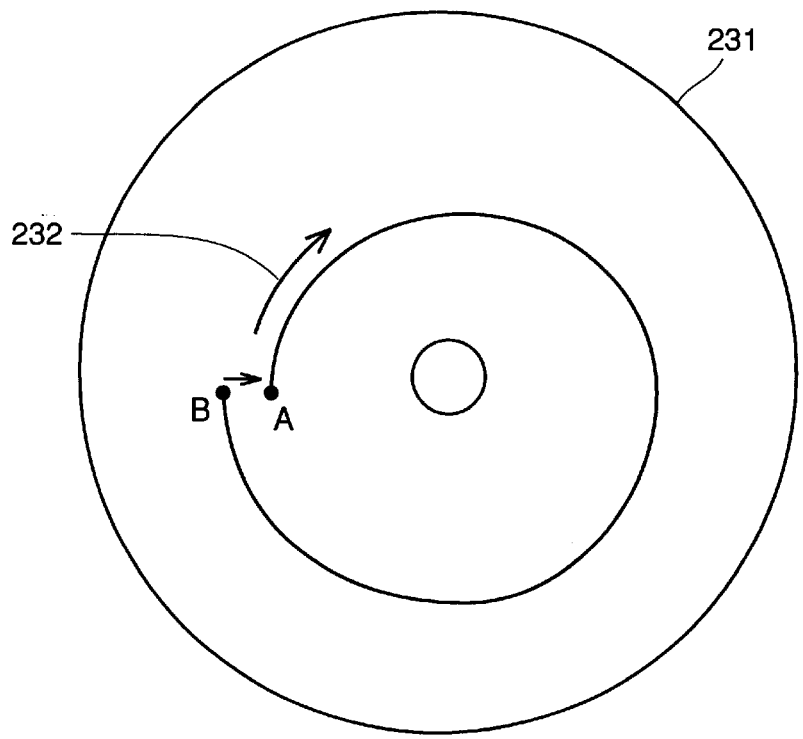
FIG. 25 is a diagram showing the moving path of an optical head over a magneto-optical recording medium when recording power is optimized using a single beam.

The length of wobble in the first and second embodiments in the range from 0.5 to 100 $\mu$m is appropriate. In the first and second embodiments, in optimizing the recording laser power, a beam formed of a main beam and two side beams by the optical super-resolution method is radiated, but the invention is not limited to this, and a normal single beam may be radiated upon the magneto-optical recording medium. In this case, optimization of the recording power is started from point A in a magneto-optical recording medium 231 shown in FIG. 25, and recording is performed by sequentially changing the power in the calibration region having the wobbles as described above. Thereafter, without recording a signal to a data region, after the optical head moves to point B, a track jump is performed to point A, the domain of the previously recorded calibration region is reproduced by a single beam, and optimum recording power is determined from the reproduced signal by the process as described above.

Third Embodiment

In a third embodiment, various magneto-optical recording media which permit optimization of laser power at the time of recording or reproducing, using the calibration region as described above will be described. In each of the following magneto-optical recording media, a TOC region, a calibration region and a track have the same structures as those described in conjunction with the first embodiment, and only the positions of the TOC region and calibration on each of the recording media are different. The optical head used for recording/reproducing the following magneto-optical recording media may be the one used in conjunction with the first embodiment.

Figure 26:
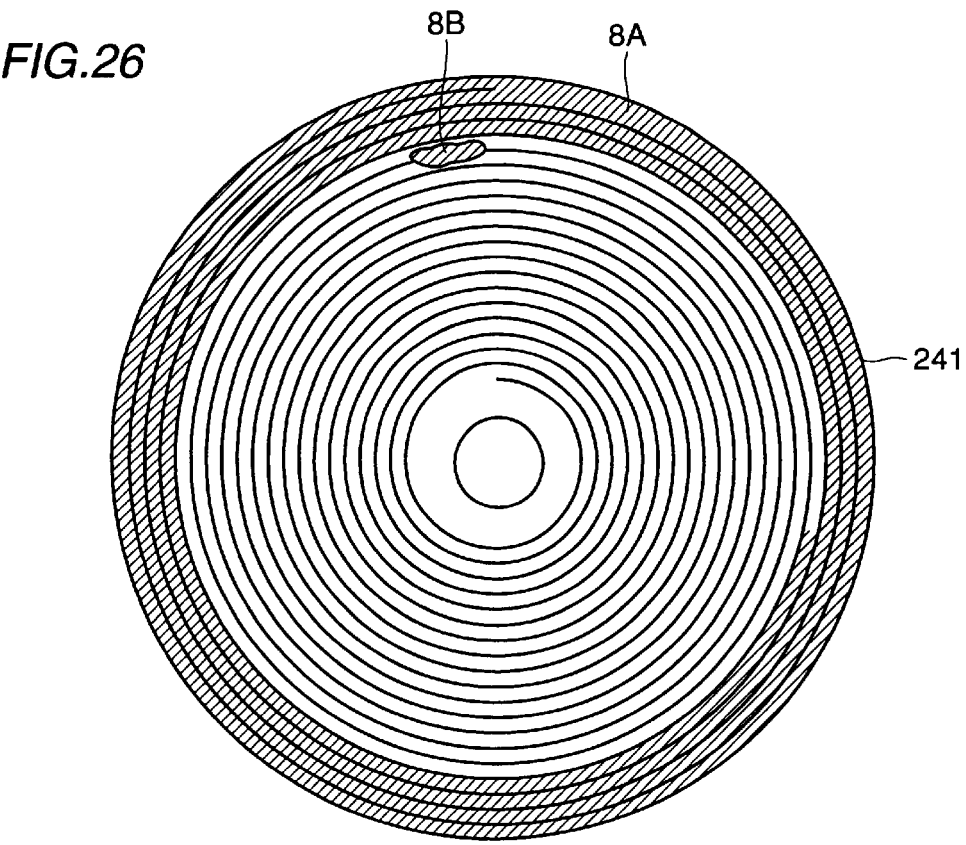
FIG. 26 is a plan view of a magneto-optical recording medium according to a third embodiment of the invention.

Referring to FIG. 26, in a magneto-optical recording medium 241, a TOC region 8A is provided at the starting end side of the outermost track, and a calibration region 8B is provided following TOC region 8A. At the time of recording or reproducing, scanning is started from the starting end side of the outermost track on magneto-optical recording medium 241, and after reproducing TOC information in TOC region 8A, the power of a laser beam at the time of recording or reproducing is optimized in calibration region 8B according to the methods described in conjunction with the first and second embodiments.

Figure 27:
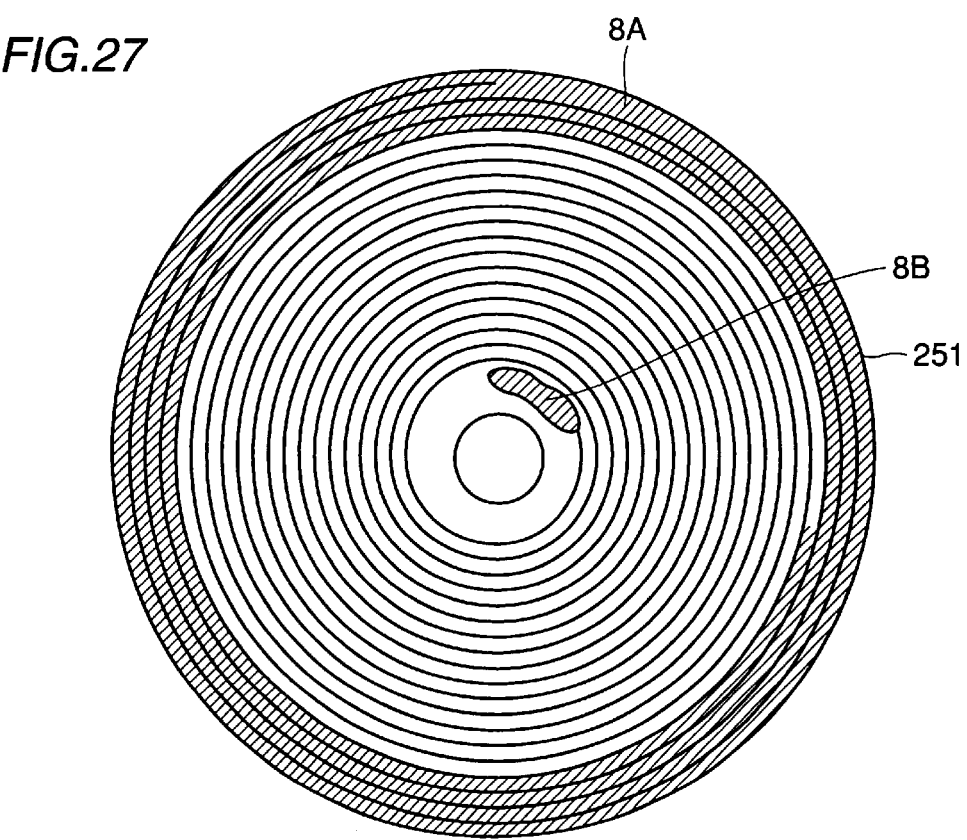
FIG. 27 is another plan view of the magneto-optical recording medium according to the third embodiment of the invention.

The magneto-optical recording medium according to the present invention may be as shown in FIG. 27. Referring to FIG. 27, in a magneto-optical recording medium 251, TOC region 8A is provided on the starting end side of the outermost track, and calibration region 8B is provided at the innermost track. In magneto-optical recording medium 251, calibration region 8B is formed at the innermost part of the track, the laser power may be optimized with minimum plane shifting of magneto-optical recording medium.

Figure 28:
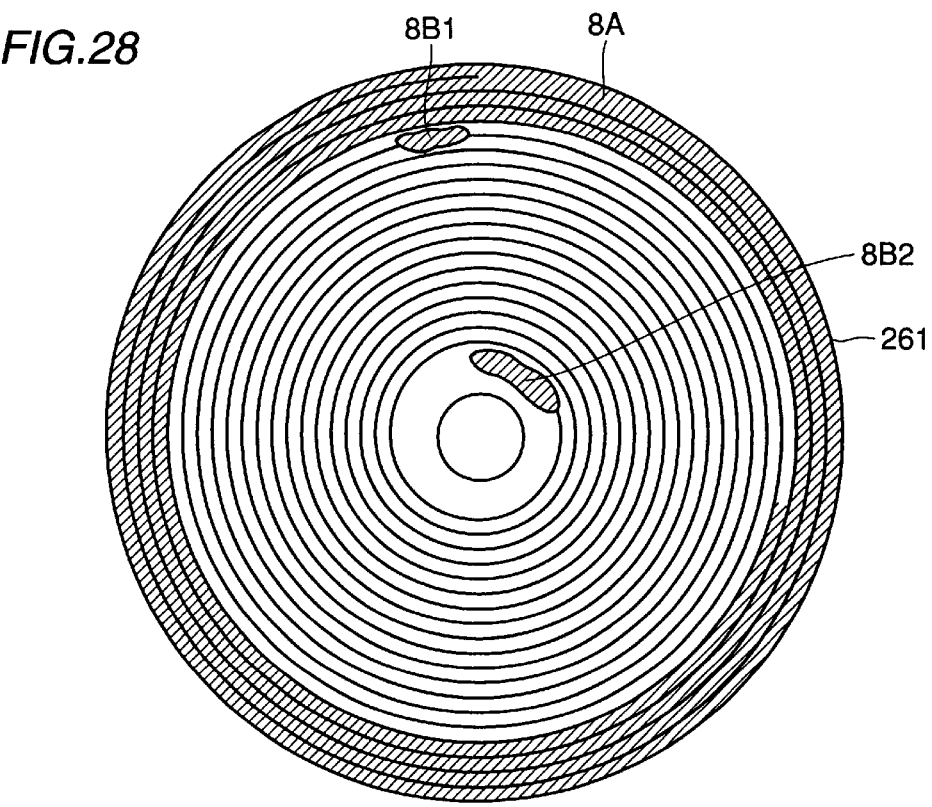
FIG. 28 is another plan view of the magneto-optical recording medium according to the third embodiment of the invention.

Furthermore, the magneto-optical recording medium according to the present invention may be as shown in FIG. 28. Referring to FIG. 28, in a magneto-optical recording medium 261, TOC region 8A is provided on the starting end side of the outermost part of the track, a first calibration region 8B1 is provided next to TOC region 8A, and a second calibration region 8B2 at the innermost part of the track. In magneto-optical recording medium 261, the laser beam reproduces the TOC state by scanning TOC region 8A, then jumps to second calibration region 8B2 formed at the innermost track, then jumps to first calibration region 8B1 formed following TOC region 8A after the laser power is optimized, and then laser power is once again optimized.

As a result, optimum power P at an arbitrary radial position r is represented by the following expression:

$$P=P2+(P1-P2)\cdot(r-r2)/(r1-r2)$$

wherein P1 is laser power obtained by optimization at first calibration region 8B1, P2 is laser power obtained by optimization at second calibration region 8B2, radius r1 represents the position of first calibration region 8B1 from the center of the magneto-optical recording medium, and radius r2 represents the position of second calibration region 8B2 from the center of the magneto-optical recording medium.

As a result, in magneto-optical recording medium 261, optimum laser powers P1 and P2 are detected before recording or reproducing a signal to magneto-optical recording medium 261, and optimum laser power at each radial position is calculated using the above expression based on the detected result, and stored in the storage of the information recording/reproducing apparatus. Based on the stored laser power, the laser power is sequentially switched at each radial position on the magneto-optical recording medium, so that even thorough optimization of laser power is permitted.

Figure 29:
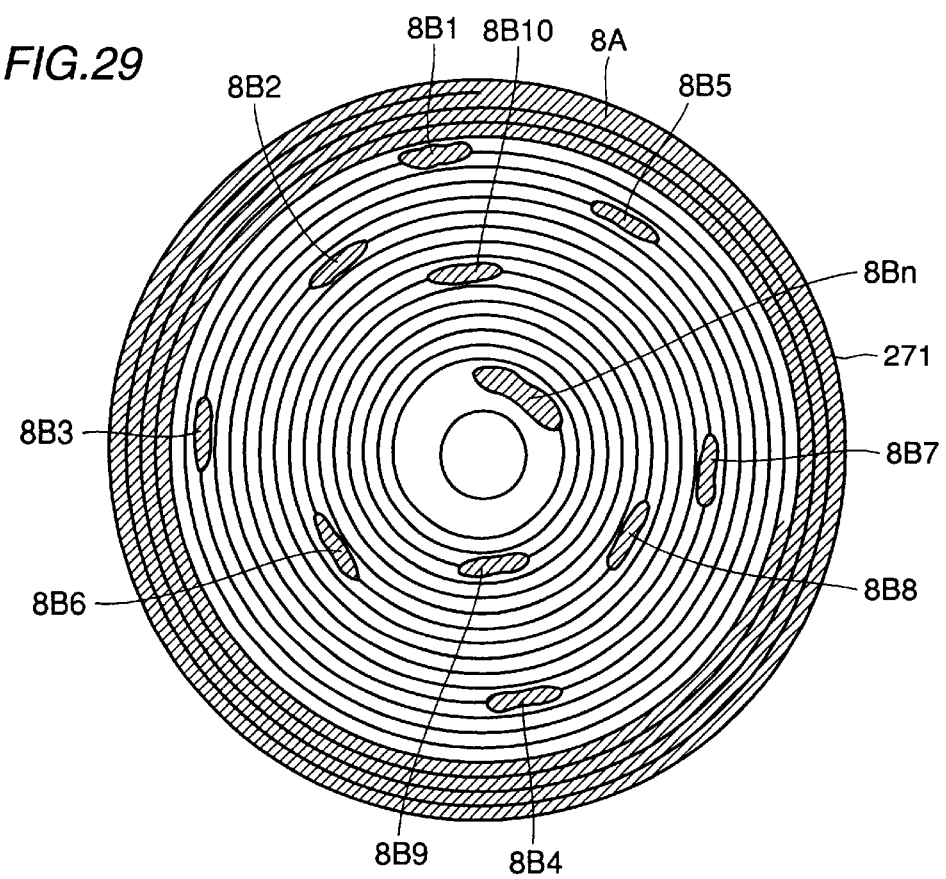
FIG. 29 is another plan view of the magneto-optical recording medium according to the third embodiment of the invention.

Furthermore, the magneto-optical recording medium according to the present invention may be as shown in FIG. 29. Referring to FIG. 29, in a magneto-optical recording medium 271, TOC region 8A is provided at the starting end side of the outermost part of the track, followed by a first calibration region 8B 1, a second calibration region 8B2, a third calibration region 8B3, a fourth calibration region 8B4, a fifth calibration region 8B5, . . . , and an n-th calibration region 8Bn at prescribed intervals. In magneto-optical recording medium 271, after a laser beam reproduces TOC information in TOC region 8A, the laser power is optimized in each of the calibration regions provided at the prescribed intervals, and a signal is recorded and/or reproduced. The prescribed interval is preferably in the range from 1 to 10 mm on the radius of the magneto-optical recording medium.

Figure 30:
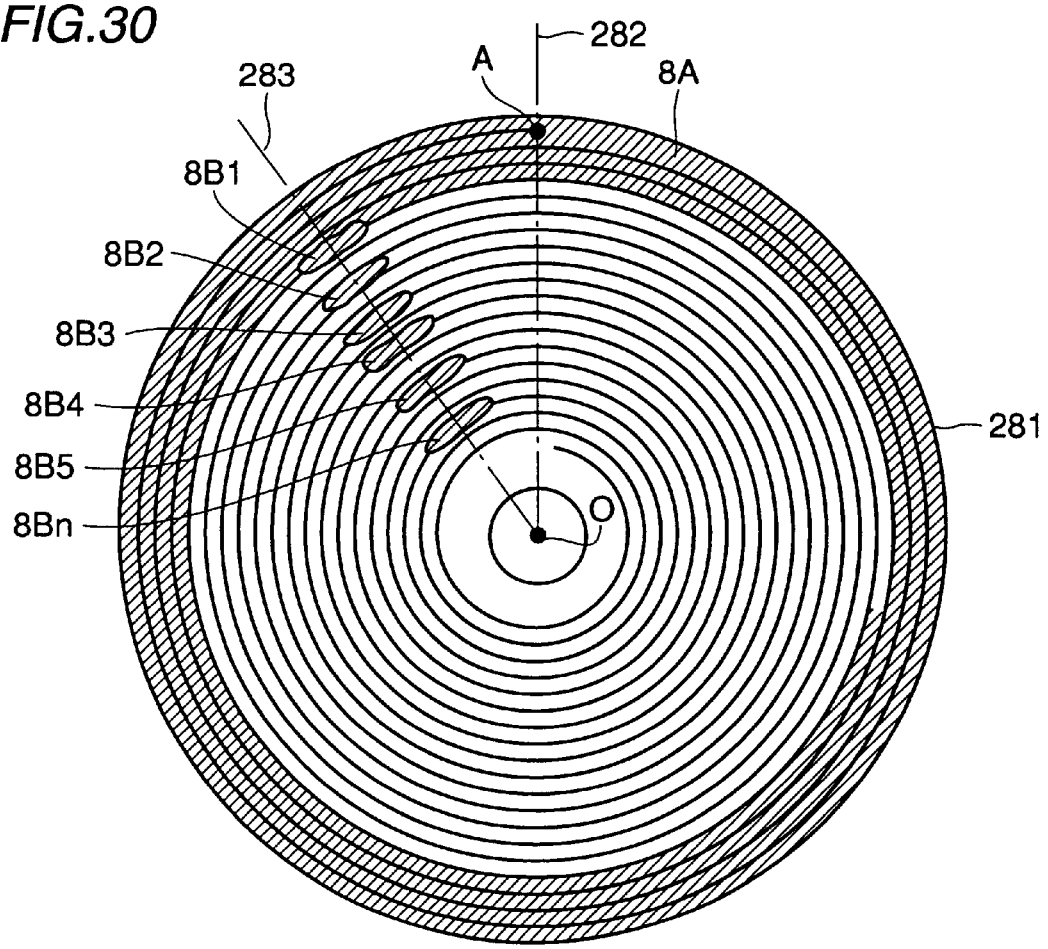
FIG. 30 is another plan view of the magneto-optical recording medium according to the third embodiment of the invention.

Furthermore, the magneto-optical recording medium according to the present invention may be as shown in FIG. 30. Referring to FIG. 30, in a magneto-optical recording medium 281, TOC region 8A is provided at the starting end side of the outermost part of the track, and at prescribed intervals along a segment 283 at a fixed angle with respect to a segment 282 connecting the center O of the magneto-optical recording medium and the starting point A of the outermost part of the track, there are provided a first calibration region 8B1, a second calibration region 8B2, a third calibration region 8B3, a fourth calibration region 8B4, a fifth calibration region 8B5, . . . , and an n-th calibration region 8Bn. Also in the magneto-optical recording medium 281, after a laser beam reproduces TOC information in TOC region 8A, the laser power is optimized in each of the calibration regions provided at the prescribed intervals, and a signal is recorded and/or reproduced. The prescribed interval is desirably in the range from 1 to 10 mm on the radius of the magneto-optical recording medium.

The magneto-optical recording media described in conjunction with FIGS. 26 to 30 are irradiated with a single laser beam or a laser beam formed of three beams according to the optical super-resolution method described in connection with the first and second embodiments, and the power of the laser beam is optimized.

Fourth Embodiment

Figure 31:
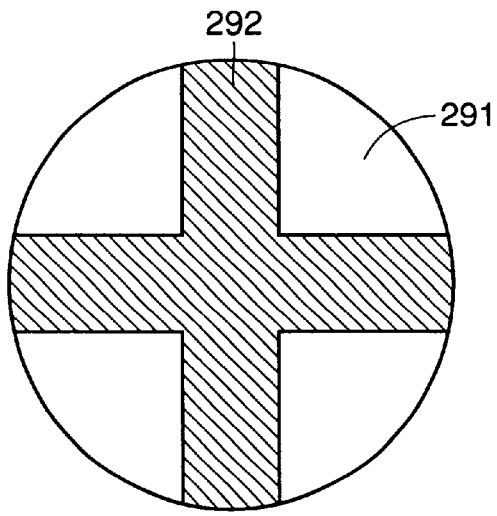
FIG. 31 schematically shows how a laser beam is shielded according to a fourth embodiment of the invention.

The optical head in the information recording/reproducing apparatus according to the present invention employs the optical super-resolution method at the time of calibrating laser power for recording as described in conjunction with FIG. 6, and radiates a laser beam formed of one main beam and two side beams by partially shielding the central part of the laser beam. However, an optical head configured to shield a laser beam crosswise as shown in FIG. 31 rather than partially shielding the central part may be employed. The shielding ratio in this case is defined as the ratio of the area of a shielding member 292 relative to the cross sectional area of laser beam 291, and set in the range from 40 to 65% according to this embodiment.

Figure 32:
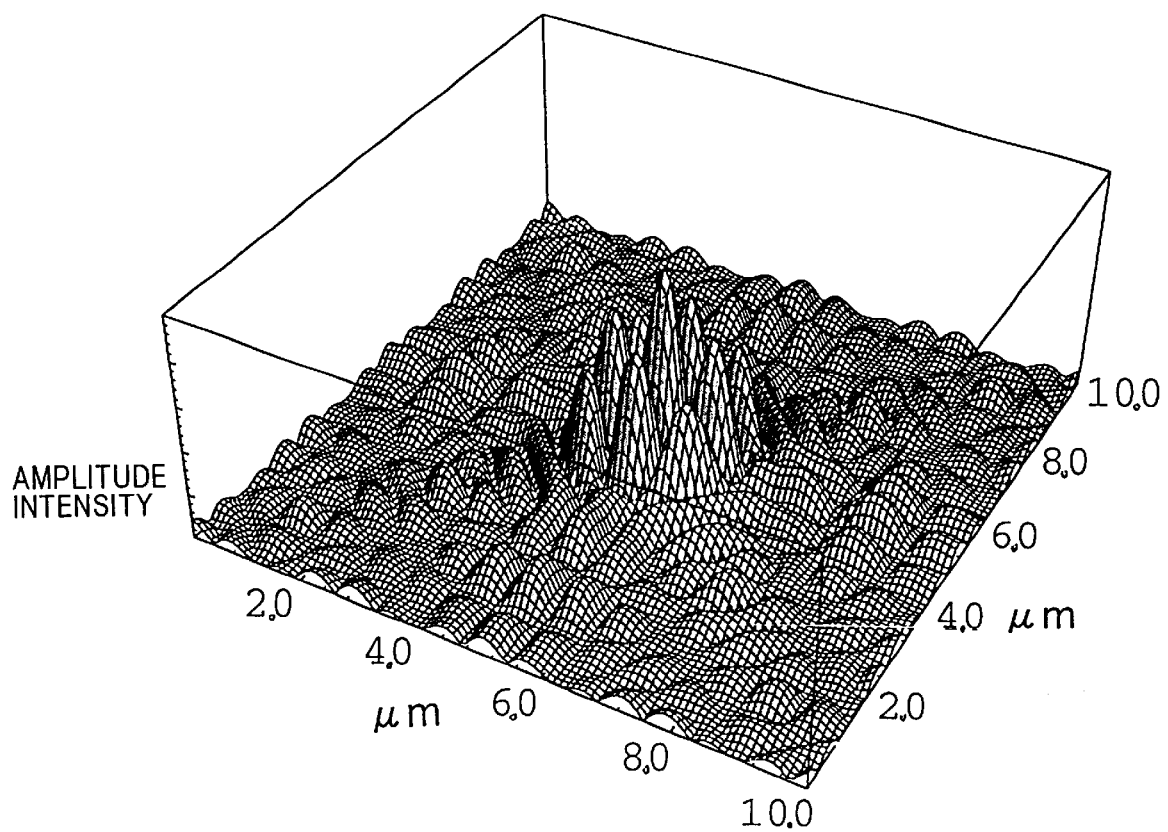
FIG. 32 shows the result of simulating the intensity of a laser beam generated by shielding the laser beam crosswise according to the fourth embodiment of the invention.
Figure 33:
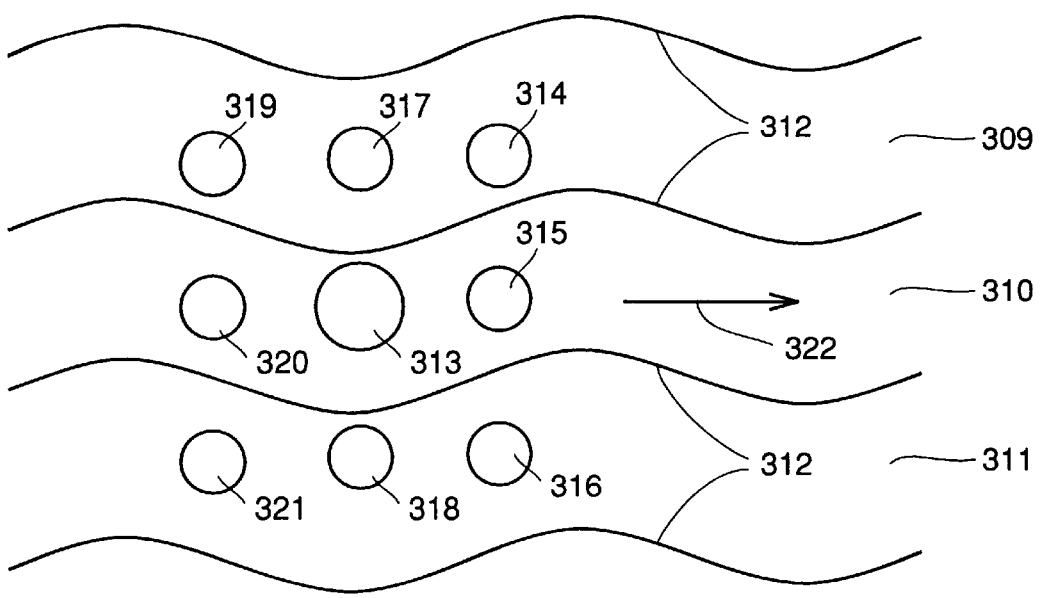
FIG. 33 is a schematic diagram showing how a laser beam is radiated upon a magneto-optical recording medium when the laser beam is shielded crosswise according to the fourth embodiment of the invention.

If a laser beam is shielded crosswise, a laser beam as shown in FIG. 32 is radiated upon a recording surface of a magneto-optical recording medium. More specifically, a beam formed of a main beam and eight side beams therearound is radiated upon. FIG. 33 shows the beam two-dimensionally. The magneto-optical medium generally has a track formed of lands 309, 311 and a groove 310, on both sidewalls of which wobbles 312 are formed at a fixed cycle. Thus, the nine beams generated by shielding a laser beam crosswise are radiated such that main beam 313 is directed to the calibration region of groove 310. Thus, a part of the groove ahead of main beam 313 with respect to the moving direction 322 of the beams is irradiated with side beams 315, and a part of the groove in the rear of the main beam is radiated with side beam 320. In land 309 next to groove 310, side beams 314, 317 and 319 are radiated in this order from the front with respect to moving direction 322, and in land 311 opposite to land 309, side beams 316, 318 and 321 are radiated in this order from the front with respect to the moving direction 322.

According to the present invention, a signal is recorded in the calibration region by main beam 313 as described above, while the signal recorded is reproduced by side beams 320, and it is determined whether or not the laser power at the time of recording is appropriate based on the waveform of the reproduced signal. Furthermore, according to the fourth embodiment, the influence of the recording laser beam to lands on both sides is examined using side beams 319 and 321. Particularly, as described in connection with the foregoing third embodiment, if a plurality of calibration regions are provided on a magneto-optical recording medium, a signal has been already recorded on a land or groove next to a calibration region, the recording power of a laser beam should be determined taking into account the influence of the power upon the adjacent land or groove. This is because the signal which has been already recorded in the data region might be erased by the influence of the main beam radiated upon the calibration region.

Figure 34:
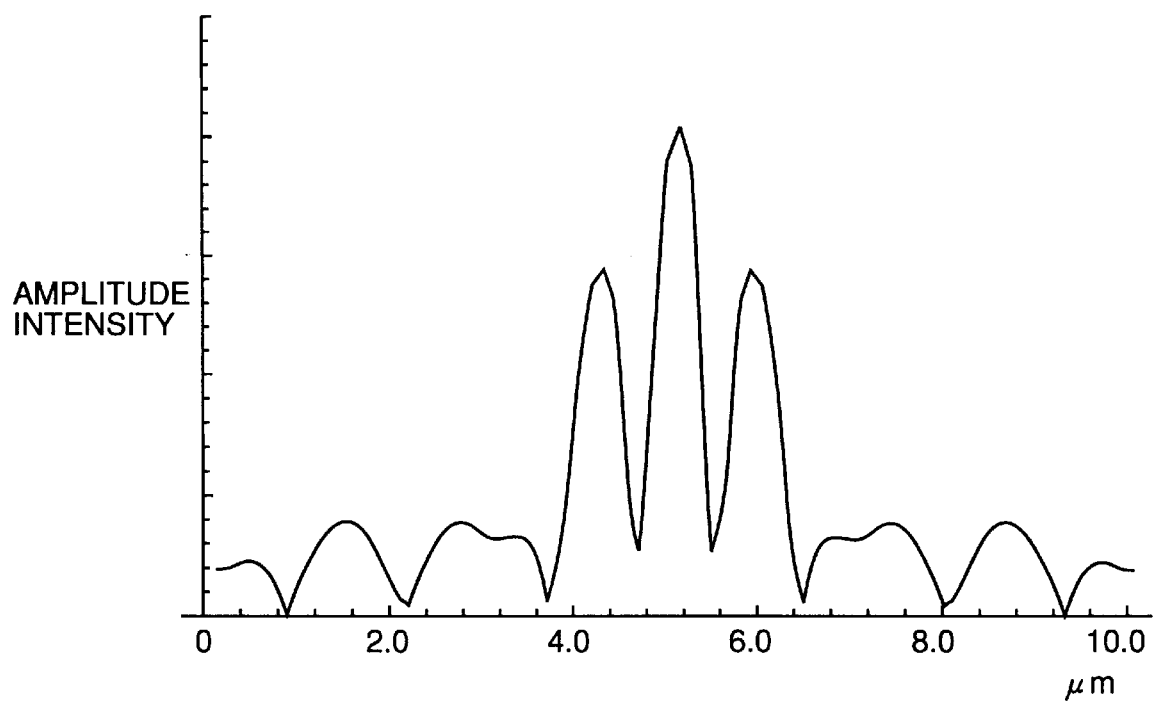
FIG. 34 is a graph showing the intensity ratio between a main beam and a side beam according to the fourth embodiment of the invention.

FIG. 34 shows the intensity ratio of main beam 313 and side beams 315 and 320. The intensities of side beams 315 and 320 are each about 0.7 times the intensity of main beam 313, and therefore if the power of the main beam is 3.5 mW, the power of side beam 320 is 2.4 mW. This is power enough for reproducing a recorded signal.

Figure 35:
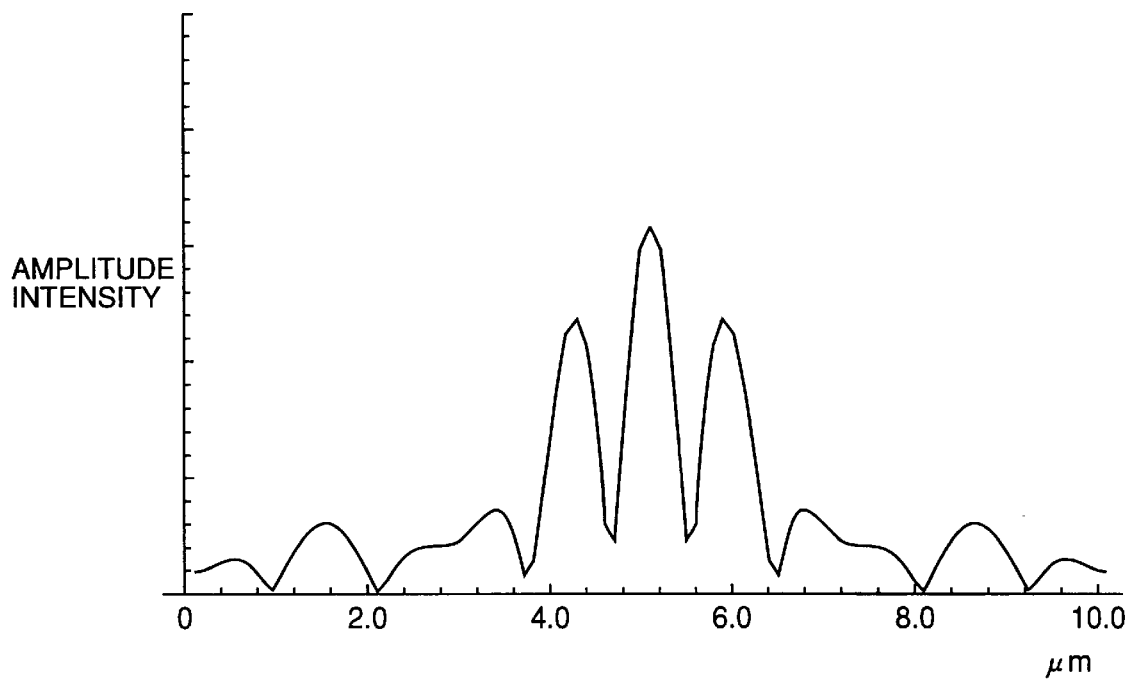
FIG. 35 is a graph showing the intensity ratio between the side beams according to the fourth embodiment of the invention.

FIG. 35 shows the intensity ratio of side beam 320 and side beams 319 and 321. In this case, the intensities of side beams 319 and 321 are each about 0.7 times the intensity of side beam 320, which is also enough power for examining the influence of the recording laser beam to an adjacent land or groove. Note that the distance between side beams 320 and 319 and the distance between side beams 320 and 321 are both about 0.8 µm, which almost corresponds to the distance between the center of the land and the center of the groove.

Figure 36:
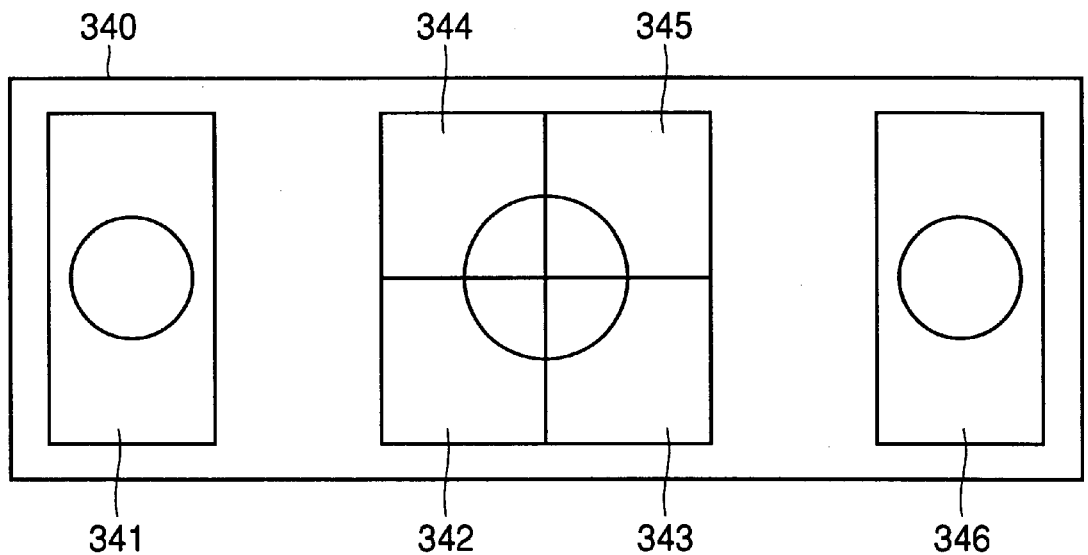
FIG. 36 is a schematic diagram showing detection patterns of a photodetector according to the fourth embodiment of the invention.

In the fourth embodiment, the photodetector in the optical head should detect the reflection of side beams 319, 320 and 321. Such photodetector will be now described in conjunction with FIG. 36. Photodetector 340 in FIG. 36 has six detection portions 341 to 346, which are provided to receive only side beams 319, 320 and 321, and do not receive the reflection of main beam 313 and side beams 314, 315, 316, 317 and 318. Side beam 320 is detected by four separated detection portions 342, 343, 344 and 345, and a detection signal is obtained as the sum of the optical intensities detected at these detection portions. Side beam 319 is detected by detection portion 341, and side beam 321 is detected by detection portion 346. The photodetector is provided in the optical head of the recording/reproducing apparatus shown in FIG. 11.

The mean for shielding the laser beam crosswise may be readily implemented by combining TN liquid crystal which is described in connection with the first embodiment and a polarizing filter which transmits only a laser beam polarized in a particular direction. A method of determining whether or not recording laser power is appropriate by reproducing a recorded signal is the same as the method described in connection with each of the foregoing embodiments, and the description is not repeated.

Using the optical head according to the fourth embodiment, a laser beam at the time of reproducing is optimized without using the optical super-resolution method. In this case, the power of the laser beam at the time of reproducing is inherently smaller than the power of the laser beam at the time of recording, the influence of the beam upon the next land or groove does not have to be taken into account.

As is the case with the information recording/reproducing apparatus shown in FIG. 11, determination circuit 30 determines the waveform of a reproduced signal, and control circuit 31 controls the operation of the optical head based on the result of determination.

According to the first to fourth embodiments, not only the magneto-optical disk, but also a phase change optical disk, a dye-based or metal-based write-once read-many optical disk may be employed. Furthermore, the present invention is applicable not only to an optical disk but also to any recording medium. In particular, as far as magneto-optical disks are concerned, a magneto-optical disk which permits a signal recorded in a recording layer to be reproduced by expanding and transferring a magnetic domain of the signal onto a reproducing layer may be employed.

Hereinafter, optimization of laser power using such a type of magneto-optical disk will be described.

Fifth Embodiment

Figure 37:
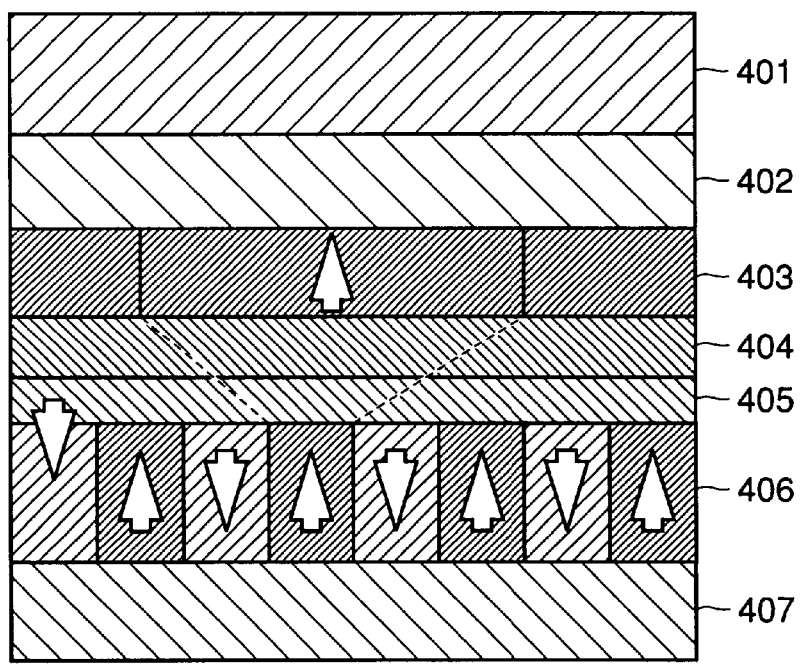
FIG. 37 is a cross sectional view of a magneto-optical recording medium according to a fifth embodiment of the invention.

The principle of reproducing by expanding magnetic domains will be now described. Simply stated, the reproducing by expanding magnetic domains is a technique of increasing a signal by expanding high density micro magnetic domains by applying an alternate reproduction magnetic field on a newly developed magneto-optical recording film. FIG. 37 shows a layered structure of a magneto-optical recording medium for use in reproducing by the expanded magnetic domains. The magneto-optical recording medium shown in FIG. 37 includes a PC substrate 401, an optical interference layer 402 of SiN, a reproduction layer 403 of GdFeCo, a non-magnetic layer 404 of SiN, a shield layer 405 of AlTi, a recording layer 406 of TbFeCo, and a protection layer 407 of SiN.

Figure 40:
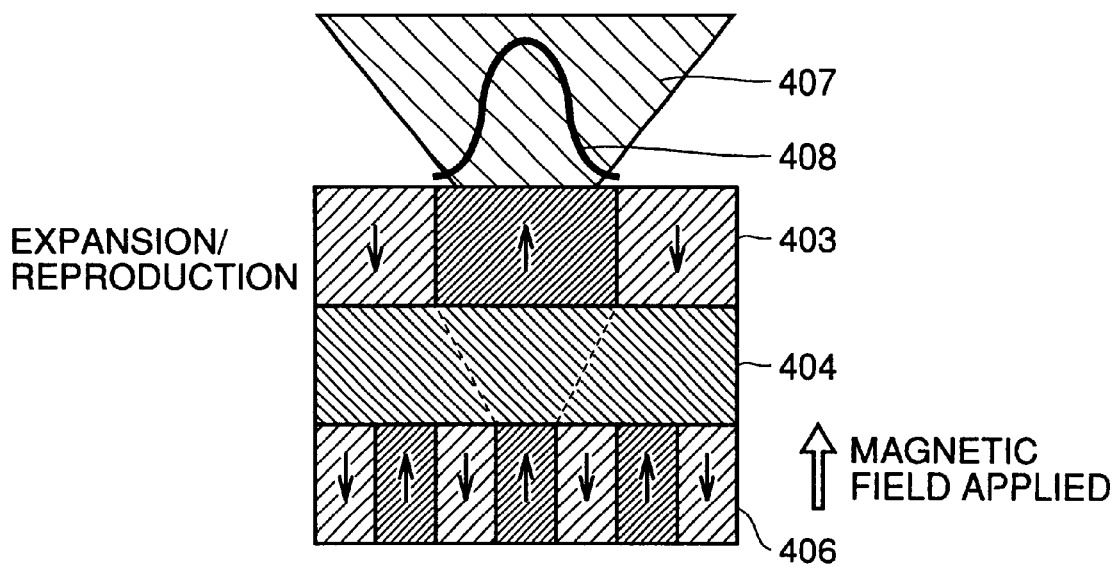
FIG. 40 is a schematic diagram showing the operation of expanding and reproducing in the magneto-optical recording medium shown in FIG. 37.
Figure 41:
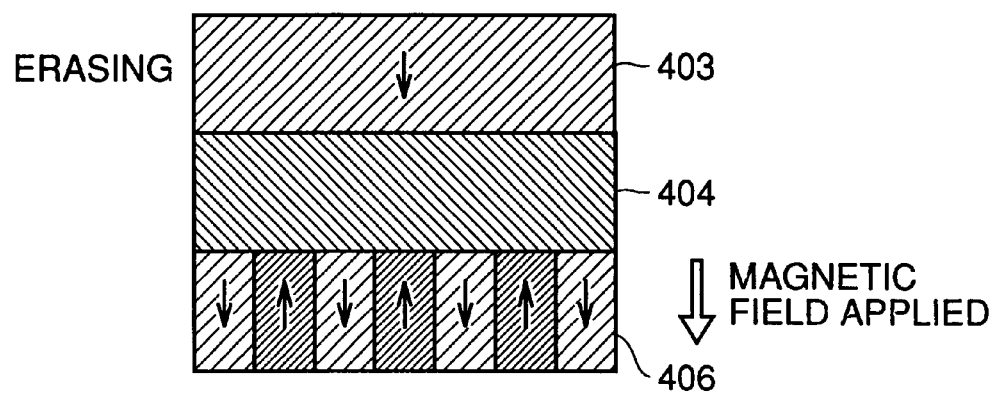
FIG. 41 is a schematic diagram showing the operation of erasing data from the magneto-optical recording medium shown in FIG. 37.
Figure 42A:
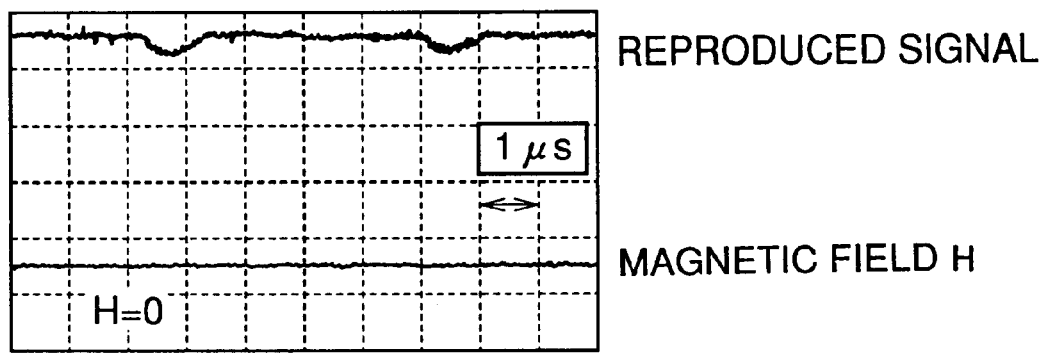
FIGS. 42A and 42B are graphs showing in comparison the waveforms of reproduced signals according to a conventional example and the fifth embodiment of the invention, respectively.
Figure 42B:
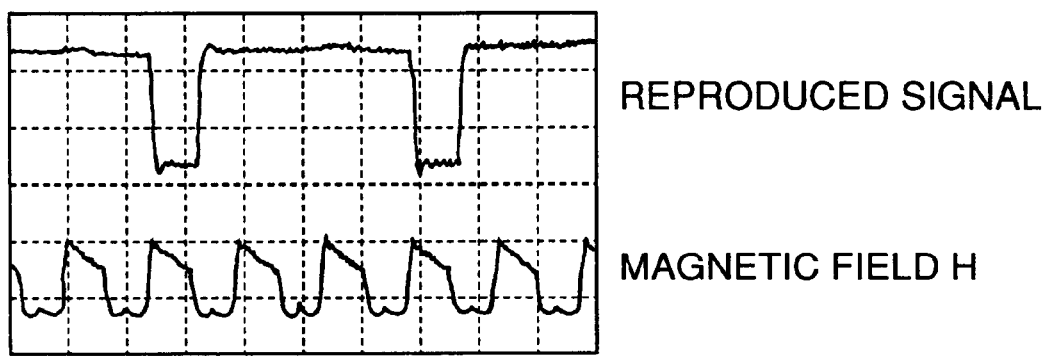

FIGS. 38 to 41 are schematic illustrations showing the principle of magnetic domain expansion reproducing in such a magneto-optical recording medium. FIG. 42A shows the waveform of a conventionally reproduced signal without such expansion of magnetic domain and FIG. 42B shows the waveform of a reproduced signal when magnetic domains are expanded according to this embodiment. In this technique, two layers, that is, expanded reproduction layer 403 and information recording layer 406, are magnetostatically coupled with non-magnetic layer 404 (and shield layer 405) therebetween. Non-magnetic layer 404 is provided to serve as a reflection film structure to increase the signal efficiency.

Figure 38:
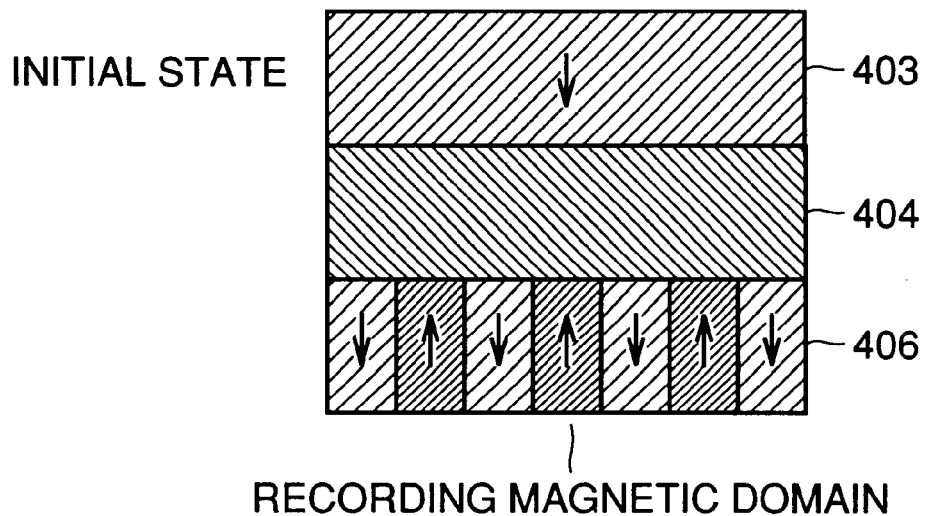
FIG. 38 is a schematic diagram showing the initial state of the magneto-optical recording medium shown in FIG. 37.
Figure 39:
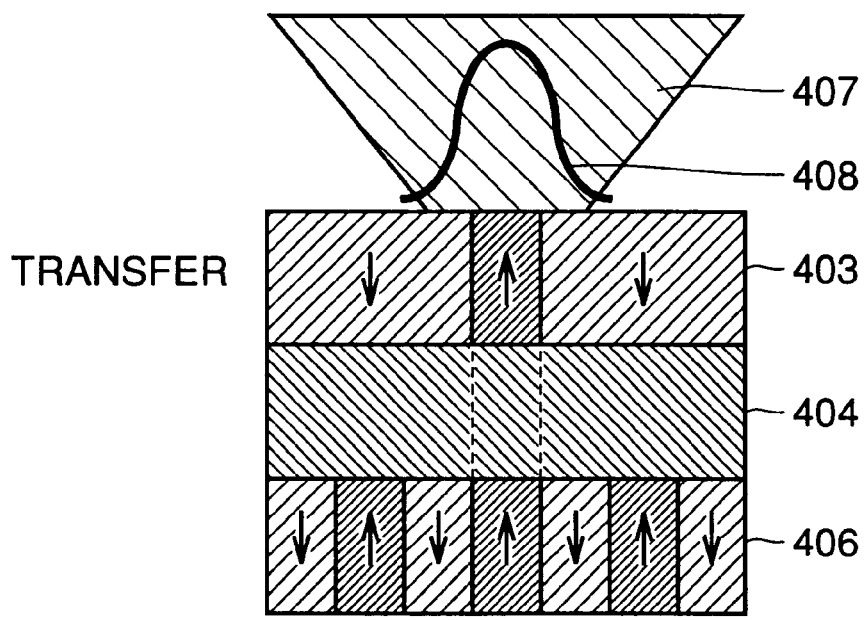
FIG. 39 is a schematic diagram showing the state of transfer in the magneto-optical recording medium shown in FIG. 37.

As shown in FIG. 38, it is assumed that magnetic domains (0.1 to 0.3 µm) far smaller than the spot diameter of a laser beam is recorded in recording layer 406. As shown in FIG. 39, when a laser beam 407 is radiated upon this magneto-optical recording medium, only the central part of the laser spot is locally heated as observed in temperature distribution 408, and only one magnetic domain in recording layer 406 only in a region the temperature of which is raised to a certain temperature or higher is transferred onto reproduction layer 403.

Herein, as shown in FIG. 40, the transferred magnetic domain greatly expands in response to application of an external magnetic field in the same direction as the magnetic domain, and the amplitude of a reproduced signal (FIG. 42B) becomes several times as large as the case of the conventional magneto-optical recording medium (FIG. 42A). As shown in FIG. 41, by inverting the polarity of the external magnetic field, the transferred magnetic domain is erased, and the medium is ready for reproducing the next magnetic domain. At the time, since recording layer 406 has coercivity far larger than the external magnetic field, the data will not be destroyed.

As described above, magnetic domain expansion reproducing may be performed by alternating an external magnetic field applied at the time of reproducing at a single frequency in synchronization with a clock for recording.

Figure 43:
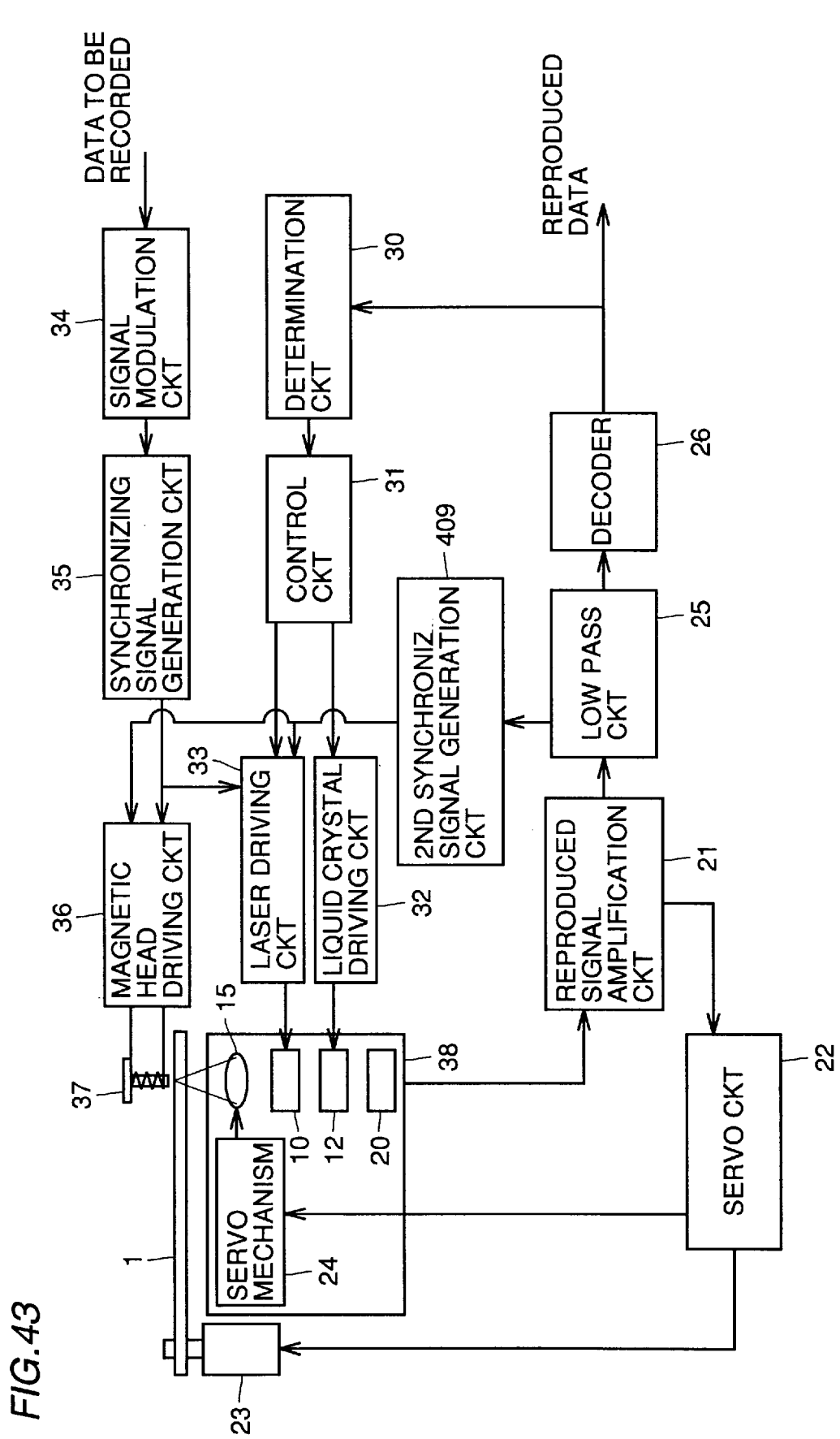
FIG. 43 is a schematic block diagram of the configuration of an information recording/reproducing apparatus according to the fifth embodiment of the invention.
Figures 44A, 44B, 44C:
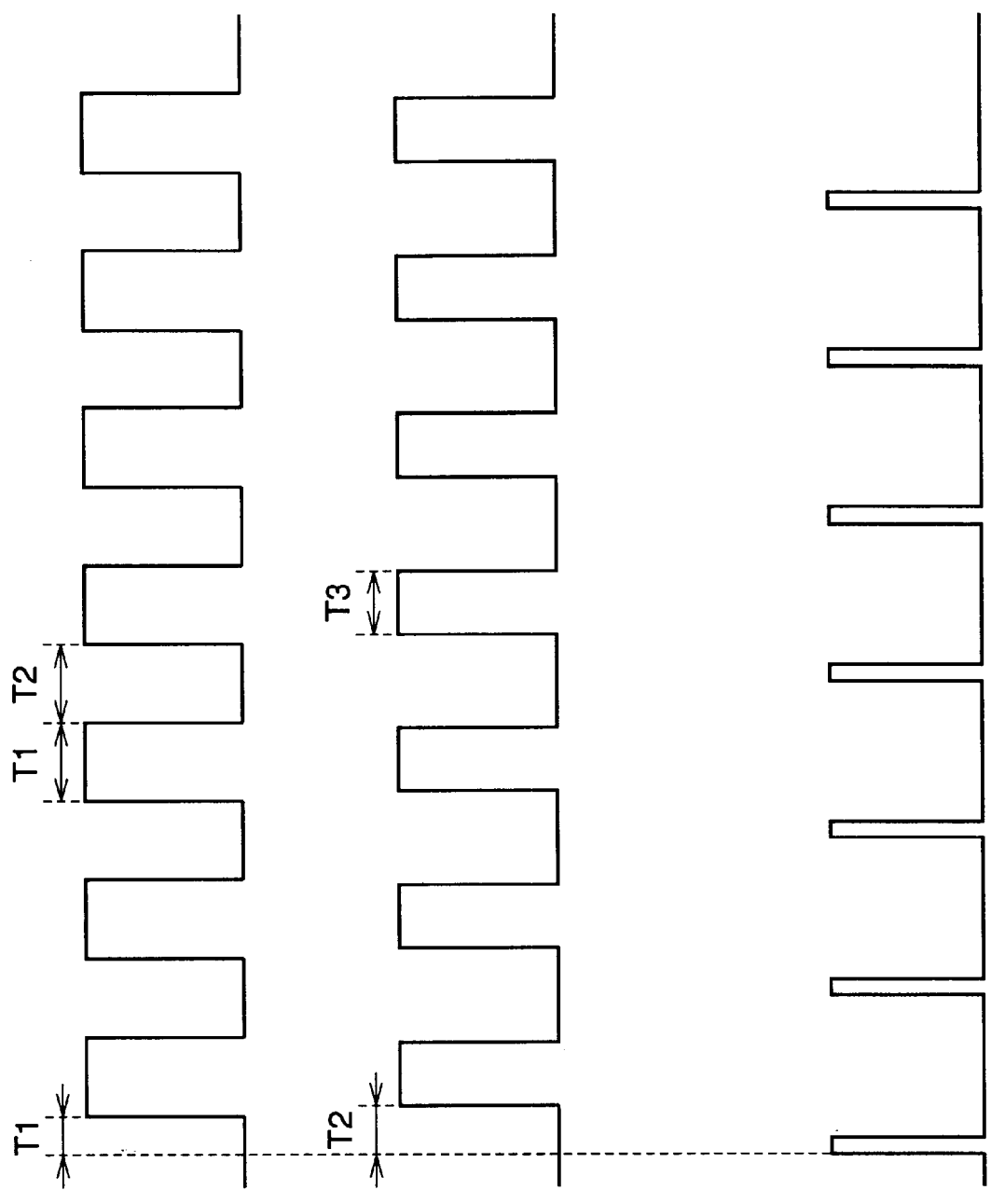
FIGS. 44A to 44C are timing charts for use in illustration of the operation of the information recording/reproducing apparatus shown in FIG. 43.

FIG. 43 is an information recording/reproducing apparatus capable of optimizing laser power to such a magneto-optical recording medium which permits the magnetic domain expansion reproducing. The information recording/reproducing apparatus shown in FIG. 43 is formed by adding a second synchronizing signal generation circuit 409 to the information recording/reproducing apparatus according to the first embodiment shown in FIG. 11. FIGS. 44A to 44C are timing charts for use in illustration of the operation of the apparatus shown in FIG. 43.

In FIG. 43, low pass circuit 25 is simultaneously provided with a signal obtained by reproducing by expanding magnetic domains in the magneto-optical recording medium, and a reproduced signal based on wobbles, pits or the like formed at a groove or land in the magneto-optical recording medium. Second synchronizing signal generation circuit 409 receives reproduced signals derived from wobbles, pits or the like among these reproduced signals from low pass circuit 25, generates a second synchronizing signal accordingly and provides laser driving circuit 33 and magnetic head driving circuit 36 with the generated signal.

Laser driving circuits 33 and magnetic head driving circuit 36 execute the operation of magnetic domain expansion reproducing from the magneto-optical recording medium according to the process described in connection with FIGS. 38 to 41.

Synchronizing signals reproduced based on wobbles, pits or the like in the magneto-optical recording medium are generally referred to as external synchronizing signals, but according to the present invention, internal synchronizing signals available by reproducing a recorded signal on the magneto-optical recording medium other than such external synchronizing signals may be used. Note however that if a reproduced signal from a magneto-optical recording medium drops out for 1 track for some reason, such internal synchronizing signals may no longer be generated, and therefore use of external synchronizing signals is more reliable.

When a synchronizing signal generated by second synchronizing signal generation circuit 409 is applied to laser driving circuit 33 and magnetic head driving circuit 36, laser driving circuits 33 drives semiconductor laser 10 to generate a pulsed laser beam as shown in FIG. 44B, while magnetic head driving circuit 36 drives magnetic head 37 to generate an alternate magnetic field as shown in FIG. 44A. FIG. 44C represents a synchronizing signal supplied from second synchronizing signal generation circuit 409 in this case.

In the alternate magnetic field shown in FIG. 44A, a magnetic domain in the reproduction layer expands when S polarity is applied to the magneto-optical recording medium. The ratio of period T1 in which the S polarity is applied and period T2 in which N polarity is applied, in other words the duty ratio of alternate magnetic fields, is set as for example T1:T2=4:6. Since a certain transition region is present in switching between the N polarity and S polarity, emission time period T3 of pulsed laser beam is shorter than the application period T1 of the S polarity used for expanding a magnetic domain.

The timing of actually applying the alternate magnetic field is the timing, $\tau_1$ after the synchronizing signal shown in FIG. 44C, and the timing of applying the pulsed laser beam is the timing, $\tau_2$ passed.

In the above embodiment, the pulsed laser beam is radiated to expand a magnetic domain in the reproducing layer, in place of such pulsed laser beam, a continuous laser beam may be continuously radiated irrespectively of the synchronizing signal to reproduce a signal.

Also in the information recording/reproducing apparatus for a magneto-optical recording medium using the principle of magnetic domain expansion reproducing, the process of optimizing the power of a laser beam is the same as that in the information recording/reproducing apparatus shown in FIG. 11, determination circuit 30 determines the waveform of a reproduced signal, and control circuit 31 controls the optical head based on the result of determination. Therefore, also in the information recording/reproducing apparatus for the magneto-optical recording medium using the principle of magnetic domain expansion reproducing, the power of the laser beam may be optimized as is the case with the first to fourth embodiments described above.

In each of the above-described embodiments, laser power is determined by detecting the waveform of a particular reproduced signal, any method of detecting change in the amplitude of the waveform of a reproduced signal may be applied, and the manner of the change is not limited to that shown in each of the above-described embodiments, and may be in any manner.

INDUSTRIAL APPLICABILITY

As in the foregoing, a recording medium and an information recording/reproducing apparatus according to the present invention permit recording and/or reproducing by an optimized laser beam, and therefore are suitably used as a highly reliable information recording medium, which can be rewritten and has a large storage capacity such as a memory for computer, and a recording/reproducing apparatus therefor.

What is claimed is:

1. An information recording/reproducing apparatus for a recording medium (1) including a recording region (8C) for recording information and one or more calibration regions (8B), said calibration region having a track shape modulated such that the amplitude of a signal reproduced therefrom can change, said apparatus comprising:

means (38) for reproducing a signal from said calibration region; and means (30) for determining the state of change in the amplitude of said reproduced signal, thereby determining power for recording and/or reproducing information, wherein said power determination means compares the amplitudes of said reproduced signal with each other in timings at a prescribed interval.

2. The information recording/reproducing apparatus as recited in claim 1, wherein said timing is a timing in synchronization with a synchronizing signal generated based on said reproduced signal.

3. An information recording/reproducing apparatus for recording and/or reproducing information to/from a magneto-optical recording medium (1) including a recording region (8C) for recording information, and a calibration region (8B) having wobbles formed such that the amplitude of the waveform of a reproduced signal can change, comprising:

optical means (38) for radiating a single laser beam upon said magneto-optical recording medium;

determination means (30) for determining the waveform of a signal reproduced by said optical means; and control means (31) for controlling said optical means according to the result of said determination to perform power level control;

wherein said determination means detects whether or not the amplitude of a signal reproduced by said optical means periodically changes.

4. An information recording/reproducing apparatus for recording and/or reproducing information to/from a magneto-optical recording medium (200) including a track divided into a plurality of zones (121a, . . . , 121n), each said zone having a recording region (8C) for recording information, and a calibration region (8B) having wobbles formed such that the amplitude of the waveform of a reproduced signal can change, comprising:

optical means (38) for selectively radiating a single laser beam or a laser beam formed of a main beam and two side beams;

determination means (30) for determining the waveform of a signal reproduced by said optical means; and control means (31) for controlling said optical means according to the result of said determination to perform power level control;

wherein said determination means detects whether or not the amplitude of a signal reproduced by said optical means periodically changes.

* * * * *

UNITED STATES PATENT AND TRADEMARK OFFICE
CERTIFICATE OF CORRECTION

PATENT NO. : 6,538,968 B1
DATED : March 25, 2003
INVENTOR(S) : Yamaguchi et al.

It is certified that error appears in the above-identified patent and that said Letters Patent is hereby corrected as shown below:

<u>Title page,</u>
Item [73], Assignee, change, "Sanyo Electric Co, Ltd.," to be -- Sanyo Electric Co., Ltd., --
Item [86], Pct No.: change "PCT/JP97/03491" to be -- PCT/JP97/03481 --

Signed and Sealed this

Sixteenth Day of September, 2003

JAMES E. ROGAN
*Director of the United States Patent and Trademark Office*